(12) United States Patent
Kim et al.

(10) Patent No.: US 8,030,411 B2
(45) Date of Patent: *Oct. 4, 2011

(54) POLYMER COMPOSITIONS COMPRISING PEPTIZERS, SPORTS EQUIPMENT COMPRISING SUCH COMPOSITIONS, AND METHOD FOR THEIR MANUFACTURE

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 668 days.

This patent is subject to a terminal disclaimer.

(21) Appl. No.: 11/639,871

(22) Filed: Dec. 15, 2006

(65) Prior Publication Data

US 2007/0142568 A1 Jun. 21, 2007

Related U.S. Application Data

(60) Provisional application No. 60/752,475, filed on Dec. 20, 2005.

(51) Int. Cl.
*A63B 37/00* (2006.01)
*A63B 37/06* (2006.01)

(52) U.S. Cl. ........ 525/256; 525/259; 525/261; 525/274; 525/332.1; 525/332.4; 525/332.7; 525/345; 525/348; 525/350; 525/351; 473/371; 473/374; 473/376; 524/99; 524/100

(58) Field of Classification Search .................. None
See application file for complete search history.

(56) References Cited

U.S. PATENT DOCUMENTS

| | | | |
|---|---|---|---|
| 3,264,272 A | 8/1966 | Rees et al. | |
| 3,492,245 A | 1/1970 | Calderon et al. | |
| 3,804,803 A | 4/1974 | Streck et al. | |
| 3,974,092 A | 8/1976 | Streck et al. | |
| 4,115,475 A | 9/1978 | Foy et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,482,663 A * | 11/1984 | Kraus .................. | 524/99 |
| 4,839,441 A | 6/1989 | Cuzin et al. | |
| 4,864,014 A | 9/1989 | Cuzin et al. | |
| 4,894,411 A | 1/1990 | Okada et al. | |
| 4,950,826 A | 8/1990 | Zerpner et al. | |
| 4,955,966 A | 9/1990 | Yuki | |
| 5,385,776 A | 1/1995 | Maxfield et al. | |
| 5,436,295 A | 7/1995 | Nishikawa et al. | |
| 5,948,862 A | 9/1999 | Sano et al. | |
| 5,959,059 A | 9/1999 | Vedula et al. | |
| 5,962,553 A | 10/1999 | Ellsworth | |
| 6,012,991 A | 1/2000 | Kim et al. | |
| 6,100,321 A | 8/2000 | Chen | |
| 6,329,458 B1 | 12/2001 | Takesue et al. | |
| 6,562,906 B2 | 5/2003 | Chen | |
| 6,569,037 B2 | 5/2003 | Ichikawa et al. | |
| 6,616,552 B2 | 9/2003 | Takesue et al. | |
| 6,692,379 B2 | 2/2004 | Morgan et al. | |
| 6,695,718 B2 * | 2/2004 | Nesbitt .................. | 473/374 |
| 6,794,447 B1 | 9/2004 | Kim et al. | |
| 6,812,276 B2 | 11/2004 | Yeager | |
| 6,905,423 B2 | 6/2005 | Morgan et al. | |
| 6,960,629 B2 | 11/2005 | Voorheis et al. | |
| 2003/0158312 A1 | 8/2003 | Chen | |
| 2004/0092336 A1 | 5/2004 | Kim et al. | |
| 2004/0230005 A1 * | 11/2004 | Voorheis et al. ........... | 525/256 |
| 2005/0059756 A1 | 3/2005 | Kim et al. | |
| 2005/0245652 A1 * | 11/2005 | Bulpett et al. .............. | 524/289 |
| 2006/0014898 A1 | 1/2006 | Kim | |
| 2006/0166762 A1 | 7/2006 | Kim et al. | |
| 2007/0015605 A1 | 1/2007 | Kim et al. | |
| 2007/0100085 A1 | 5/2007 | Kim et al. | |
| 2008/0090678 A1 * | 4/2008 | Kim et al. .................. | 473/378 |
| 2009/0170634 A1 * | 7/2009 | Loper et al. ................ | 473/373 |

OTHER PUBLICATIONS

Rostek, "Novel Sulfur Vulcanization Accelerators Based on Mercapto-Pyridine", Rubber Chemistry and Technology 69(2); 1996; pp. 180-202.*

* cited by examiner

*Primary Examiner* — David Buttner
(74) *Attorney, Agent, or Firm* — Klarquist Sparkman, LLP

(57) ABSTRACT

Embodiments of the disclosed polymer composition comprise a first unsaturated polymer or polymer precursor, and an effective amount of a peptizer. The peptizer typically comprises a heteroaryl or a heterocyclic compound, other than morpholine as disclosed in assignee's prior applications. Disclosed polymer compositions are useful for making sports equipment, such as at least one layer of a golf ball, often a core. Because the compositions are useful for making golf balls, materials commonly known for making such golf balls can be used in combination with the polymer composition. A method for forming a golf ball also is disclosed. The method comprises providing disclosed compositions and then forming at least one component of a golf using the composition.

19 Claims, 2 Drawing Sheets

POLYMER COMPOSITIONS COMPRISING PEPTIZERS, SPORTS EQUIPMENT COMPRISING SUCH COMPOSITIONS, AND METHOD FOR THEIR MANUFACTURE

CROSS-REFERENCE TO RELATED APPLICATIONS

This application claims the benefit of the earlier filing date of U.S. Provisional Application No. 60/752,475 filed on Dec. 20, 2005. The entire disclosure of the provisional application is considered to be part of the disclosure of the following application and is incorporated herein by reference.

FIELD

The present disclosure concerns polymer compositions comprising peptizers, particularly nitrogen-based heteroaryl or heterocyclic peptizers, such as pyridine, diazines and/or triazine compounds, and a method for making products, such as golf balls, comprising such compositions.

BACKGROUND

A. Golf Ball Construction and Composition

Modern golf balls generally comprise a core and at least one additional outer layer. Two-piece balls, having a cover around a solid, often single-piece, spherical rubber core, provide high initial speeds but relatively low spin rates, and hence perform well for drives and other shots made using woods, but do not perform as well for shots made with short irons where distance is less important and high spin rate is desirable. Ball performance can be modified, particularly the travel distance and the feel transmitted to the golfer through the club, by including additional layers between the core and outer cover layer. A three-piece ball has one additional layer between the core and outer cover layer, a four-piece ball has two additional layers between the core and outer cover layer, and so on.

The compositions that are used to make particular golf ball layers also can significantly affect golf ball performance. Compositions can be modified to vary, for example, polymer hardness, compression, resilience and/or durability. Most modern golf balls now utilize core compositions made from synthetic rubbers based on polybutadiene, especially cis-1,4-polybutadiene. To vary core properties the polybutadiene often is further formulated with crosslinking agents, such as sulfur or peroxides, or with co-crosslinking agents, such as zinc diacrylate. The weight and hardness of the core may be further adjusted by incorporating various filler materials.

Polyalkenamers, which typically include a linear polymeric component and a significant fraction of cyclic oligomer molecules to lower their viscosity, also are useful for making golf balls. Compounds of this class can be produced in accordance with the teachings of U.S. Pat. Nos. 3,804,803, 3,974,092 and 4,950,826, the entire contents of all of which are incorporated herein by reference. Additional compositions for forming golf balls are disclosed in applicants' copending provisional applications, Nos. 60/646,669 and 60/706,562, both of which applications are incorporated herein by reference.

B. Golf Ball Compositions Comprising Peptizers

A variety of materials other than polymers or rubber, such as fillers and processing aids, are commonly used to make golf balls. Small amounts of chemical peptizers, for example, have been incorporated into golf ball cores to accelerate polybutadiene rubber softening under the influence of a mechanical force, heat, or a combination thereof. As used herein, a peptizer is a compound or composition that inhibits cross-linking during the initial processing of unsaturated polymers, but which then participates in the cross-linking of the unsaturated polymer after cross-linking has commenced. A wider array of active chemical ingredients and fillers can be incorporated into a composition when peptizers are used relative to compositions formulated without peptizers. Peptizers also facilitate processing compositions, such as by lowering processing temperatures.

Particular peptizers are known for making polymer compositions, including golf ball compositions. For example, U.S. Pat. No. 4,955,966, states that the "rubber composition of the present invention may be incorporated with various known additives, for example, vulcanization accelerator, vulcanization retarder, antioxidant, plasticizer, peptizer, tackier, antitack agent, sponging agent, dispersant, dusting agent, mold release agent, solvent, softening agent and the like." The '966 patent, column 10, lines 3-9, (emphasis added). This is the only disclosure provided by the '966 patent concerning peptizers. The majority of patents that disclose using peptizers to make golf ball compositions do not provide information or otherwise identify particular peptizers useful for making such compositions.

A few patent documents do disclose specific peptizer compounds. For example, U.S. Pat. No. 5,948,862 discloses using diphenyl disulfide peptizers. U.S. Pat. Nos. 6,569,037, 6,692,379 and 6,905,423 disclose using zinc salts of pentachlorothiophenol. The '423 patent specifically states that:

> The soft intermediate layer may also contain additives, fillers, thickeners, or a combination thereof, to adjust the specific gravity of the layer to alter various golf ball properties as needed or desired. "RENACIT" 7 is a peptizer produced by Miles, Inc. of Pittsburgh, Pa., that is a pentachlorothiophenol mixture containing Kaolin, quartz, and mineral oil. Materials such as "RENACIT" 7 can be used to alter the properties of the inner surface of the mantle layer. Specifically, it can be used to soften the inner surface.

The '423 patent, column 12, lines 32-39.

TaylorMade® also has several issued patents and patent applications that discuss using peptizers for making golf ball compositions, including U.S. application Ser. No. 10/926,509, entitled "Golf Balls Incorporating Nanofillers," and U.S. application Ser. Nos. 10/662,619, 10/662,626, 10/662,628 and 10/662,719, entitled "Golf Balls Incorporating Peptizers and Method of Manufacture." Each of these prior TaylorMade® applications is incorporated herein by reference. These prior applications state, for example, that:

> Peptizers can be defined as chemicals that inhibit cross-linking during the processing of unsaturated polymers. The peptizer can further participate in the cross-linking of the unsaturated polymer when cross-linking does begin. The peptizer comprises an organic sulfur compound and/or its metal or non-metal salt. Examples of the organic sulfur compound include: thiophenols, such as pentachlorothiophenol and its metal and non-metal salts, 4-butyl-o-thiocresol, 4 t-butyl-p-thiocresol, and 2-benzamidothiophenol; thiocarboxylic acids, such as thiobenzoic acid; 4,4'dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Examples of the metal salts of an organic sulfur compound include zinc salts of the above-mentioned thiophenols and thiocarboxylic acids. Examples of non-metal salts of an organic sulfur compound include the amine or ammonium salts of the above-mentioned thiophenols and thiocarboxylic acids. Preferred peptizers include pentachlorothiophenol, its metal salts, and its non-metal salts, and dibenzamido diphenyldisulfide. Peptizers can be used alone or in an admixture of two or more peptizers.

SUMMARY

As far as the inventors know, no one has made compositions, particularly golf ball compositions, that comprise peptizers disclosed herein, such as nitrogen-based, heteroaryl or heterocyclic peptizers. Compositions of the present invention provide added flexibility for formulating golf ball compositions and for making golf balls having physical properties that differ from golf balls that currently can be made.

Embodiments of the disclosed polymer composition comprise a first unsaturated polymer or polymer precursor, and an effective amount of a peptizer. The peptizer typically comprises a heteroaryl or a heterocyclic compound, other than morpholine as disclosed in assignee's prior applications. The peptizer also may be acyclic. Heterocyclic and acyclic compounds typically comprise an unsaturated compound, and even more typically are conjugated compounds having at least one heteroatom, such as nitrogen, oxygen, or sulfur, and most typically nitrogen, conjugated to a functional group bearing a sulfur atom, such as a sulfhydryl group. All possible combinations of such peptizers also can be used to make suitable compositions. Moreover, the composition also may comprise at least one additional peptizer known prior to the present invention, such as organic sulfur compounds, metal salts of organic sulfur compounds, non-metal salts of organic sulfur compounds, and combinations thereof.

The peptizer may be a heteroaryl or heterocyclic compound having a formula

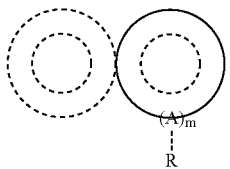

where A is a heteroatom, m is from 1 to n, where n is the number of atoms in the ring, and R is optionally present and is hydrogen or an aliphatic group. The peptizer may have more than one ring, and each ring typically has from about 3 atoms to at least about 10 ring atoms, more typically from about 4 to about 7 ring atoms, and preferred compounds have at least one ring having 5 or 6 ring atoms. For peptizers comprising more than one ring, each ring may have the same or a different number of atoms per ring. Examples of specific classes of peptizers include peptizers based on indole, quinoline, isoquinoline, pyridine, purine, pyrimidine, diazine, triazine, carbazole, or combinations of such peptizers.

A more specific structural chemical formula depicting disclosed sulfur-substituted heteroaryl or heterocyclic peptizers compounds is as follows

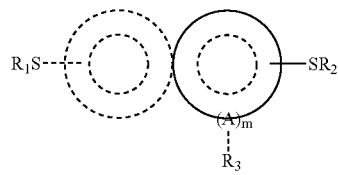

where A is a heteroatom, e.g., nitrogen, oxygen or sulfur, preferably nitrogen, m is from 1 to n, where n is the number of atoms in the ring, $R_1$-$R_2$ are the same or different, and are independently hydrogen, sulfur and aliphatic groups, and $R_3$ is optionally present and is hydrogen or an aliphatic group.

Disclosed peptizers can include additional functional groups. Such substituted compounds also typically satisfy a formula

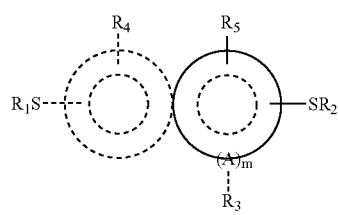

where A again is a heteroatom, m is from 1 to n, where n is the number of atoms in the ring, $R_1$-$R_2$ are the same or different, and are independently hydrogen, sulfur, and aliphatic groups, $R_3$ is optionally present and is hydrogen or an aliphatic group, $R_4$ and $R_5$ are the same or different, and are independently hydrogen, halogen, and aliphatic groups.

Disclosed peptizers may be heteroaryl compounds, often nitrogen-based compounds having a formula

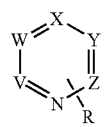

A more specific structural formula is as follows

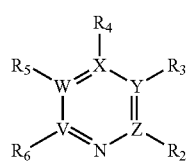

where V—Z independently are carbon or heteroatoms. Such peptizers also optionally may include at least one R group selected from hydrogen, halogen oxygen-bearing moieties, sulfur-bearing moieties, aliphatic groups, and combinations thereof. Likewise, $R_2$-$R_6$ independently are hydrogen, halogen, oxygen-bearing moieties, sulfur-bearing moieties, and aliphatic groups, most typically hydrogen, halogen, particularly chlorine, and sulfur-bearing moieties. Certain disclosed compounds have at least one of $R_2$-$R_6$=—SH, and at least one of the remaining $R_2$-$R_6$=halogen, more typically the remaining $R_2$-$R_6$ are halogen.

Pyridine-based peptizers can be depicted using a formula

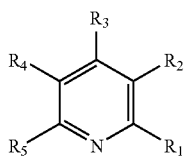

where $R_1$-$R_5$ are independently hydrogen, halogen, typically chlorine, oxygen-bearing moieties, sulfur-bearing moieties, such as sulfhydryl or disulfides, and aliphatic groups.

Heteroaryl compounds having two or more heteroatoms, such as nitrogen, also can function as suitable peptizers. Examples of peptizers having two nitrogen atoms include

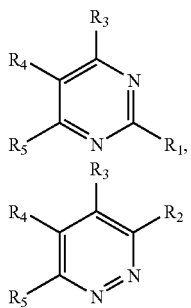

where $R_1$-$R_5$ are independently hydrogen, halogen, oxygen-bearing moieties, sulfur-bearing moieties, and aliphatic groups.

Examples of heteroaryl compounds having 3 ring nitrogen atoms have a formula

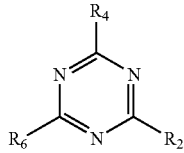

where $R_2$, $R_4$ and $R_6$ independently are hydrogen, halogen, oxygen-bearing moieties, sulfur-bearing moieties and aliphatic groups. Preferred compounds typically have at least one halogen, typically chlorine, and also typically include a sulfur-bearing moiety, such as a sulfhydryl group.

The peptizer may be used as a salt. The salt may be a metal salt, a non-metal salt, such as an ammonium salt, a mixed metal and non-metal salt, and combinations thereof.

Suitable polymer compositions often include unsaturated synthetic rubber, natural rubber, a polyalkenamer, an olefinic thermoplastic elastomer, and combinations thereof. Examples of unsaturated polymers include, without limitation, 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer, styrene-isoprene-styrene block copolymer, nitrile rubber, silicone rubber, polyurethane, or mixtures thereof. Preferred poly(1,4-butadiene) rubbers contain at least 40 mol % cis-1,4 bonds, and even more preferably include at least 80 mol % cis-1,4 bonds.

The polymer composition according to claim 1 can include at least one additional polymer as well. This additional polymer or polymers may be included after any crosslinking occurs, or can be blended with the at least a second polymer. Thus, the polymer composition may comprise from about 1 to about 99 weight percent of an additional thermoplastic or thermoset polymeric material, including without limitation, synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, polyalkenamers, crosslinked polyalkenamers, polyisoprene rubber, styrene-butadiene rubber, polyurethane ionomer, thermoplastic polyurethanes, thermoplastic polyureas, polyamides, copolyamides, polyesters, copolyesters, polycarbonates, polyolefins, halogenated polyolefins, halogenated polyethylenes, polyphenylene oxide, polyphenylene sulfide, diallyl phthalate polymer, polyimides, polyvinyl chloride, polyamide-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, a compound having a general formula $(R_2N)_m$—R'—$(X(O)_nOR_y)_m$, wherein R is selected from the group consisting of hydrogen, one or more $C_1$-$C_{20}$ aliphatic systems, one or more cycloaliphatic systems, one or more aromatic systems, R' is a bridging group comprising one or more unsubstituted $C_1$-$C_{20}$ straight chain or branched aliphatic or alicyclic groups, one or more substituted straight chain or branched aliphatic or alicyclic groups, one or more aromatic groups, one or more oligomers each containing up to 12 repeating units, and when X is C or S or P, m is 1-3, when X=C, n=1 and y=1, when X=S, n=2 and y=1, and when X=P, n=2 and y=2, and any and all combinations of such materials. Preferred polymer composition often include 80% by weight or greater poly(1,4-butadiene) rubber.

Polymer compositions also typically include at least one cross-linking agent. The cross-linking agent often is a peroxide, and can be a primary, secondary, or tertiary aliphatic, alicyclic or aromatic peroxide, and also may include plural peroxy groups. Specific examples of suitable cross-linking agents include diacetyl peroxide, di-tert-butyl peroxide, dibenzoyl peroxide, dicumyl peroxide, 2,5-dimethyl-2,5-di(benzoylperoxy)hexane, 1,4-bis-(tert-butylperoxyisopropyl)benzene, tert-butylperoxybenzoate, 2,5-dimethyl-2,5-di-(tert-butylperoxy)hexyne, 1,1-bis(tert-butylperoxy)-3,3,5-tri-methylcyclohexane, di-(2,4-dichlorobenzoyl)peroxide, 2,5-dimethyl-2,5-di(tert-butyl peroxy)hexane, 1,4-di-(2-tert-butyl peroxyisopropyl)benzene, tert-butyl perbenzoate, tert-butyl cumyl peroxide, and combinations thereof.

Disclosed polymer compositions are useful for making sports equipment, such as golf balls. Thus, disclosed embodiments also concern a polymer composition useful for making at least one layer of a golf ball, where the composition comprises an unsaturated polymer or polymer precursor, a cross-linking agent, and an effective amount of a peptizer comprising a heteroaryl compound, a heterocycle other than morpholine, an organic sulfur compound comprising at least one heteroatom conjugated to a functional group bearing a sulfur atom, and combinations thereof. The components of the composition can have the attributes discussed above for such compositions. The golf ball layer often is a core.

Because the compositions are useful for making golf balls, materials commonly known for making such golf balls can be used in combination with the polymer composition, such as a fiber, a filler, a cross-linking agent selected from sulfur compounds, peroxides, azides, maleimides, e-beam radiation, gamma-radiation, a co-cross-linking agent comprising zinc or magnesium salts of an unsaturated fatty acid having from about 3 to about 8 carbon atoms, a base resin, a peptizer known prior to the present application, an accelerator, a UV stabilizer, a photostabilizer, a photoinitiator, a co-initiator, an antioxidant, a colorant, a dispersant, a mold release agent, a processing aid, a density adjusting filler, a nano-filler, an inorganic filler, an organic filler, and combinations thereof. Examples of fillers include precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, calcium carbonate, magnesium carbonate, barium carbonate, calcium sulfate, magnesium sulfate, barium sulfate, tungsten, steel, copper, cobalt, iron, metal alloys, tungsten carbide, zinc oxide, calcium oxide, barium oxide, titanium dioxide, metal stearates, particulate carbonaceous materials, nanofillers and any and all combinations thereof. Examples of nanofiller include inorganic clays selected from the group consisting of hydrotalcite, phyllosilicate, saponite, hectorite, beidellite, stevensite, vermiculite, halloysite, mica, montmorillonite, micafluoride, octosilicate, and combinations thereof. The nanofiller may be surface treated with a compatibilizer selected from the group consisting of hydroxy-, thiol-, amino-, epoxy-, carboxylic acid-, ester-, amide-, and siloxygroup containing compounds, oligomers, polymers and combinations thereof. The nanofiller may be intercalated within the polymeric material or exfoliated within the polymer.

Golf balls made according to the present invention typically have a PGA compression of from about 30 to about 190, more typically from about 40 to about 160, even more typically from about 50 to about 130, and most typically from about 60 to about 100.

A person of ordinary skill in the art also will appreciate that the size of golf balls that can be made using the disclosed compositions can vary. For example, for golf balls having one or more intermediate layers and a cover layer, the one or more intermediate layers or cover layer may have a thickness of from about 0.01 to about 0.20 inch, more typically from about 0.02 to about 0.15 inch, even more typically from about 0.03 to about 0.1 inch, and most typically from about 0.03 to about 0.06 inch. The hardness of disclosed golf balls layers also can vary, so that one or more intermediate layers or cover layer may have a Shore D hardness of greater than about 25, typically greater than about 30, and even more typically about 40 or greater.

Disclosed golf balls also may have various cover layers. For example, the cover layer may be formed from a composition comprising a reaction product of (a) diol(s), polyol(s), or combinations thereof; (b) diisocyanate(s), polisocyanate(s), or combinations thereof; (c) diamine(s), polyamine(s), or combinations thereof; or any combinations of (a), (b), and (c). Moreover, the cover layer may be formed by a method comprising mixing at least one component A that is a monomer, oligomer, prepolymer, or polymer comprising at least 5% by weight of anionic functional groups; at least one component B that is a monomer, oligomer, prepolymer, or polymer comprising less by weight of anionic functional groups than the weight percentage of anionic functional groups of the at least one component A; and at least one component C that is a metal cation, thereby forming a first composition. The first composition is melt-processed to produce a reaction product of the anionic functional groups of the at least one component A and the at least one component C to form the polymer blend composition, wherein the polymer blend composition incorporates an in-situ-formed pseudo-crosslinked network of the at least one component A in the presence of the at least one component B.

A method for forming a golf ball also is disclosed. The method comprises providing a composition comprising an unsaturated polymer material useful for forming a golf ball and an effective amount of peptizer comprising a heteroaryl compound, a heterocycle other than morpholine, an organic sulfur compound comprising at least one heteroatom conjugated to a functional group bearing a sulfur atom, and combinations thereof. At least one component of a golf ball is then formed using the composition.

The foregoing and other objects, features, and advantages of the invention will become more apparent from the following detailed description, which proceeds with reference to the accompanying figures.

DETAILED DESCRIPTION

I. Introduction and Definitions

Figure 1:
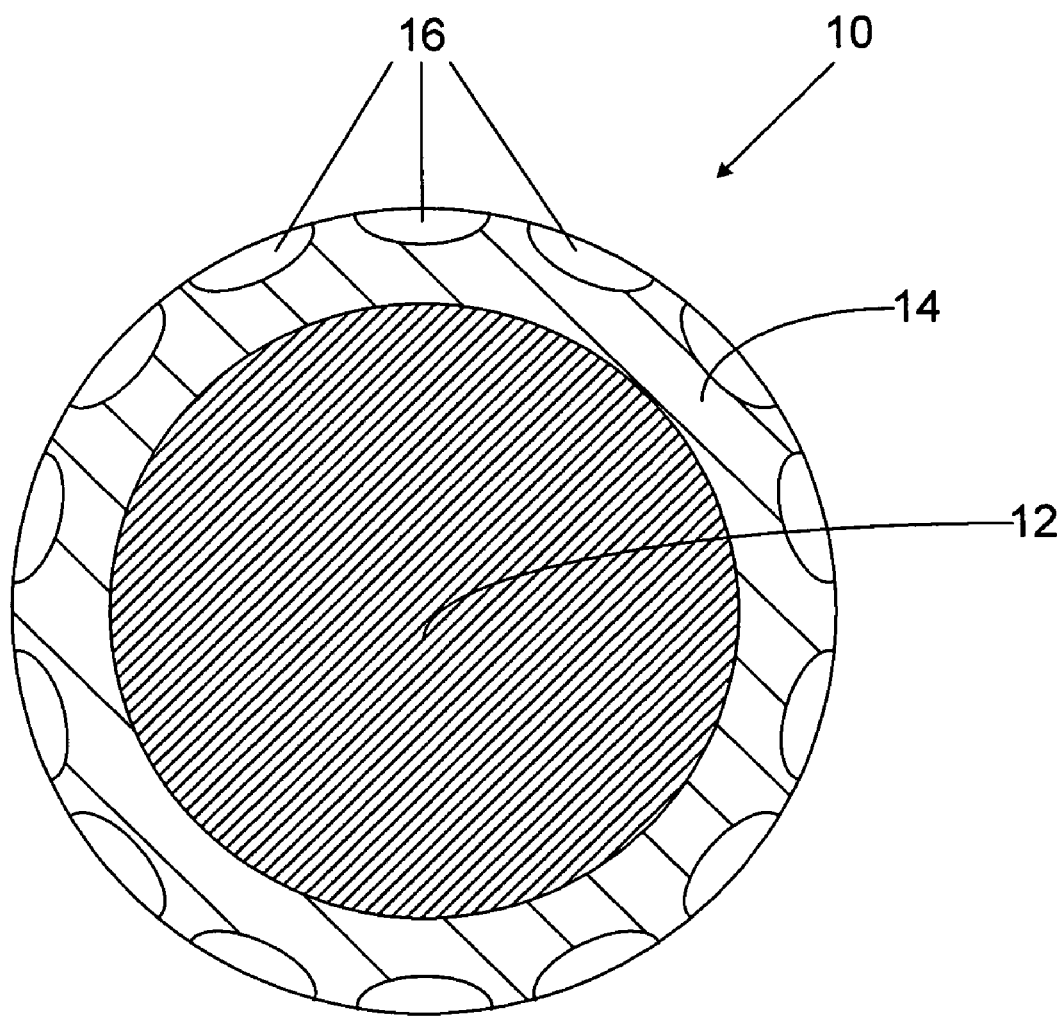
FIG. 1 is a schematic cross section of a two-piece golf ball.

The following definitions, presented in alphabetical order, are provided to aid the reader, and are not intended to provide term definitions that would be narrower than would be understood by a person of ordinary skill in the art of golf ball composition and manufacture.

Any numerical values recited herein include all values from the lower value to the upper value. All possible combinations of numerical values between the lowest value and the highest value enumerated herein are expressly included in this application.

The terms "aryl" and "heteroaryl" as used herein refer to any aryl group, which optionally can be substituted, or any "heteroaryl" group, which also optionally can be substituted, and includes, by way of example and without limitation, phenyl, biphenyl, indenyl, naphthyl(1-naphthyl, 2-naphthyl), N-hydroxytetrazolyl, N-hydroxytriazolyl, N-hydroxyimidazolyl, anthracenyl(1-anthracenyl, 2-anthracenyl, 3-anthracenyl), thiophenyl(2-thienyl, 3-thienyl), furyl(4-furyl, 3-furyl), indolyl, oxadiazolyl, isoxazolyl, quinazolinyl, fluorenyl, xanthenyl, isoindanyl, benzhydryl, acridinyl, thiazolyl, pyrrolyl (2-pyrrolyl), pyrazolyl(3-pyrazolyl), imidazolyl(1-imidazolyl, 2-imidazolyl, 4-imidazolyl, 5-imidazolyl), triazolyl(1, 2,3-triazol-1-yl, 1,2,3-triazol-2-yl 1,2,3-triazol-4-yl, 1,2,4-triazol-3-yl), oxazolyl(2-oxazolyl, 4-oxazolyl, 5-oxazolyl), thiazolyl(2-thiazolyl, 4-thiazolyl, 5-thiazolyl), pyridyl(2-pyridyl, 3-pyridyl, 4-pyridyl), pyrimidinyl(2-pyrimidinyl, 4-pyrimidinyl, 5-pyrimidinyl, 6-pyrimidinyl), pyrazinyl, pyridazinyl(3-pyridazinyl, 4-pyridazinyl, 5-pyridazinyl), quinolyl(2-quinolyl, 3-quinolyl, 4-quinolyl, 5-quinolyl, 6-quinolyl, 7-quinolyl, 8-quinolyl), isoquinolyl(1-isoquinolyl, 3-isoquinolyl, 4-isoquinolyl, 5-isoquinolyl, 6-isoquinolyl, 7-isoquinolyl, 8-isoquinolyl), benzo[b]furanyl(2-benzo[b]furanyl, 3-benzo[b]furanyl, 4-benzo[b]furanyl, 5-benzo[b]furanyl, 6-benzo[b]furanyl, 7-benzo[b]furanyl), 2,3-dihydro-benzo[b]furanyl(2-(2,3-dihydro-benzo[b]furanyl), 3-(2,3-dihydro-benzo[b]furanyl), 4-(2,3-dihydro-benzo[b]furanyl), 5-(2,3-dihydro-benzo[b]furanyl), 6-(2,3-dihydro-benzo[b]furanyl), 7-(2,3-dihydro-benzo[b]furanyl), benzo[b]thiophenyl(2-benzo[b]thiophenyl, 3-benzo[b]thiophenyl, 4-benzo[b]thiophenyl, 5-benzo[b]thiophenyl, 6-benzo[b]thiophenyl, 7-benzo[b]thiophenyl), 2,3-dihydro-benzo[b]thiophenyl, (2-(2,3-dihydro-benzo[b]thiophenyl), 3-(2,3-dihydro-benzo[b]thiophenyl), 4-(2,3-dihydro-benzo[b]thiophenyl, 5-(2,3-dihydro-benzo[b]thiophenyl), 6-(2,3-dihydro-benzo[b]thiophenyl), 7-(2,3-dihydro-benzo[b]thiophenyl), indolyl(1-indolyl, 2-indolyl, 3-indolyl, 4-indolyl, 5-indolyl, 6-indolyl, 7-indolyl), indazole (1-indazolyl, 3-indazolyl, 4-indazolyl, 5-indazolyl, 6-indazolyl, 7-indazolyl), benzimidazolyl(1-benzimidazolyl, 2-benzimidazolyl, 4-benzimidazolyl, 5-benzimidazolyl, 6-benzimidazolyl, 7-benzimidazolyl, 8-benzimidazolyl), benzoxazolyl (1-benzoxazolyl, 2-benzoxazolyl), benzothiazolyl(1-benzothiazolyl, 2-benzothiazolyl, 4-benzothiazolyl, 5-benzothiazolyl, 6-benzothiazolyl, 7-benzothiazolyl), carbazolyl(1-carbazolyl, 2-carbazolyl, 3-carbazolyl, 4-carbazolyl), 5H-dibenz[b,f]azepine (5H-dibenz[b,f]azepin-1-yl, 5H-dibenz[b,f]azepine-2-yl, 5H-dibenz[b,f]azepine-3-yl, 5H-dibenz[b,f]azepine-4-yl, 5H-dibenz[b,f]azepine-5-yl, 10,11-dihydro-5H-dibenz[b,f]azepine (10,11-dihydro-5H-dibenz[b,f]azepine-1-yl, 10,11-dihydro-5H-dibenz[b,f]azepine-2-yl.

The term "bimodal polymer" refers to a polymer comprising two main fractions and more specifically to the form of the polymer's molecular weight distribution curve, i.e., the appearance of the graph of the polymer weight fraction as a function of its molecular weight. When the molecular weight distribution curves from these fractions are superimposed onto the molecular weight distribution curve for the total resulting polymer product, that curve will show two maxima or at least be distinctly broadened in comparison with the curves for the individual fractions. Such a polymer product is called bimodal. The chemical compositions of the two fractions may be different.

"Conjugated" refers to an organic compound containing two or more sites of unsaturation (e.g., carbon-carbon double bonds, carbon-carbon triple bonds, and sites of unsaturation comprising atoms other than carbon, such as nitrogen) separated by a single bond.

As used herein, the term "core" is intended to mean the elastic center of a golf ball, which may have a unitary construction. Alternatively the core itself may have a layered construction, e.g. having a spherical "center" and additional "core layers," with such layers being made of the same material or a different material from the core center.

The term "cover" is meant to include any layer of a golf ball that surrounds the core. Thus a golf ball cover may include both the outermost layer and also any intermediate layers, which are disposed between the golf ball center and outer cover layer. "Cover" may be used interchangeably with the term "cover layer".

A "fiber" is a general term and the definition provided by Engineered Materials Handbook, Vol. 2, "Engineering Plastics", published by A.S.M. International, Metals Park, Ohio, USA, is relied upon to refer to filamentary materials with a finite length that is at least 100 times its diameter, which typically is 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned also are considered to be encompassed by the invention. Thus, the terms "fibers" and "fiber segments" are used herein. "Fibers or fiber segments" and "fiber elements" are used to encompass both fibers and fiber segments. Embodiments of the golf ball components described herein may include fibers including, by way of example and without limitation, glass fibers, such as E fibers, Cem-Fil filament fibers, and 204 filament strand fibers; carbon fibers, such as graphite fibers, high modulus carbon fibers, and high strength carbon fibers; asbestos fibers, such as chrysotile and crocidolite; cellulose fibers; aramid fibers, such as Kevlar, including types PRD 29 and PRD 49; and metallic fibers, such as copper, high tensile steel, and stainless steel. In addition, single crystal fibers, potassium titanate fibers, calcium sulphate fibers, and fibers or filaments of one or more linear synthetic polymers, such as Terylene, Dacron, Perlon, Orion, Nylon, including Nylon type 242, are contemplated. Polypropylene fibers, including monofilament and fibrillated fibers are also contemplated. Golf balls according to the present invention also can include any combination of such fibers. Fibers used in golf ball components are described more fully in Kim et al. U.S. Pat. No. 6,012,994, which is incorporated herein by reference.

The term "fully-interpenetrating network" refers to a network that includes two independent polymer components that penetrate each other, but are not covalently bonded to each other.

In the case of a ball with two intermediate layers, the term "inner intermediate layer" may be used interchangeably herein with the terms "inner mantle" or "inner mantle layer" and is intended to mean the intermediate layer of the ball positioned nearest to the core.

The term "intermediate layer" may be used interchangeably with "mantle layer," "inner cover layer" or "inner cover" and is intended to mean any layer(s) in a golf ball disposed between the core and the outer cover layer.

The term "(meth)acrylate" is intended to mean an ester of methacrylic acid and/or acrylic acid.

The term "(meth)acrylic acid copolymers" is intended to mean copolymers of methacrylic acid and/or acrylic acid.

A "nanocomposite" is defined as a polymer matrix having nanofiller within the matrix. Nanocomposite materials and golf balls made comprising nanocomposite materials are disclosed in Kim et al., U.S. Pat. No. 6,794,447, and U.S. Pat. Nos. 5,962,553 to Ellsworth, 5,385,776 to Maxfield et al., and 4,894,411 to Okada et al., which are incorporated herein by reference in their entirety. Inorganic nanofiller materials generally are made from clay, and may be coated by a suitable compatibilizing agent, as discussed below in further detail. The compatibilizing agent allows for superior linkage between inorganic and organic material, and it also can account for the hydrophilic nature of the inorganic nanofiller material and the possibly hydrophobic nature of the polymer. Nanofiller particles typically, but not necessarily, are approximately 1 nanometer (nm) thick and from about 100 to about 1,000 nm across, and hence have extremely high surface area, resulting in high reinforcement efficiency to the material at low particle loading levels. The sub-micron-sized particles enhance material properties, such as the stiffness of the material, without increasing its weight or opacity and without reducing the material's low-temperature toughness. Materials incorporating nanofiller materials can provide these property improvements at much lower densities than those incorporating conventional fillers.

Nanofillers can disperse within a polymer matrix in three ways. The nanofiller may stay undispersed within the polymer matrix. Undispersed nanofillers maintain platelet aggregates within the polymer matrix and have limited interaction with the polymer matrix. As the nanofiller disperses into the polymer matrix, the polymer chains penetrate into and separate the platelets. When viewed by transmission electron microscopy or x-ray diffraction, the platelet aggregates are expanded relative to undispersed nanofiller. Nanofillers at this dispersion level are referred to as being intercalated. A fully dispersed nanofiller is said to be exfoliated. An exfoliated nanofiller has the platelets fully dispersed throughout the polymer matrix; the platelets may be dispersed unevenly but preferably are dispersed substantially evenly.

Nanocomposite materials are materials incorporating from about 0.1% to about 20%, preferably from about 0.1% to about 15%, and most preferably from about 0.1% to about 10% nanofiller potentially reacted into and preferably substantially evenly dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer. When used in the manufacture of golf balls, nanocomposite materials can be blended effectively into ball compositions at a typical weight percentage, without limitation, of from about 1% to about 50% of the total composition used to make a golf ball component, such as a cover or core, by weight.

The term "outer cover layer" is intended to mean the outermost cover layer of the golf ball on which, for example the dimple pattern, paint and any writing, symbol, etc. is placed. If, in addition to the core, a golf ball comprises two or more cover layers, only the outermost layer is designated the outer cover layer. The remaining layers may be designated intermediate layers. The term outer cover layer is interchangeable with the term "outer cover".

In the case of a ball with two intermediate layers, the term "outer intermediate layer" may be used interchangeably herein with the terms "outer mantle" or "outer mantle layer" and is intended to mean the intermediate layer of the ball which is disposed nearest to the outer cover layer.

"Peptizers" are chemical(s) or compositions that have been used by rubber compounders to facilitate the processing of natural or synthetic rubbers and other difficult-to-process high viscosity elastomers during milling and mastication. High shear mixing of elastomers or rubbers brings can cause chemical degradation or scission of some of the polymer chains into two or several parts and each chain end is either a free radical or the result of disproportionation of free radicals. This chain scission mechanism thus brings about an initial reduction in the number of higher molecular weight species. In the absence of a peptizer, these free radicals quickly recombine without a significant reduction in viscosity. However, in the presence of peptizers, a peroxide free radical is formed which is more stable than the original radical, with the result that the viscosity is reduced quite significantly. Peptizers are chemical(s) or compositions that inhibit polymer cross-linking, most typically cross-linking of unsaturated polymers, but which can participate in polymer cross-linking after cross-linking is initiated.

The term "polyalkenamer" is used interchangeably herein with the term "polyalkenamer rubber" and means a polymer of one or more alkenes, including cycloalkenes, having from 5-20, preferably 5-15, most preferably 5-12 ring carbon atoms. The polyalkenamers may be prepared by any suitable method including ring opening metathesis polymerization of one or more cycloalkenes in the presence of organometallic catalysts as described in U.S. Pat. Nos. 3,492,245, and 3,804,803, the entire contents of both of which are incorporated herein by reference.

"Polymer precursor material" refers to any material that can be further processed to form a final polymer material of a manufactured golf ball, such as, by way of example and not limitation, monomers that can be polymerized, or a polymerized or partially polymerized material that can undergo additional processing, such as crosslinking.

The term "pseudo-crosslinked network" refers to materials that have crosslinking, but, unlike chemically vulcanized elastomers, pseudo-crosslinked networks are formed in-situ, not by covalent bonds, but instead by ionic clustering of the reacted functional groups, which clustering may disassociate at elevated temperatures.

The term "semi-interpenetrating network" refers to a network that includes at least one polymer component that is linear or branched and interspersed in the network structure of at least one of the other polymer components.

A "thermoplastic material" is generally defined as a material that is capable of softening or fusing when heated and of hardening again when cooled. Thermoplastic polymer chains often are not cross-linked, but the term "thermoplastic" as used herein may refer to materials that initially act as thermoplastics, such as during an initial extrusion process or injection molding process, but which also may be crosslinked, such as during a compression molding step to form a final structure.

The term "unimodal polymer" refers to a polymer comprising one main fraction and more specifically to the form of the polymer's molecular weight distribution curve, i.e., the molecular weight distribution curve for the total polymer product shows only a single maximum.

II. Golf Ball Composition and Construction

FIG. 1 illustrates a two-piece golf ball 10 comprising a solid center or core 12, and an outer cover layer 14. Golf balls also typically include plural dimples 16 formed in the outer cover and arranged in various desired patterns.

Figure 2:
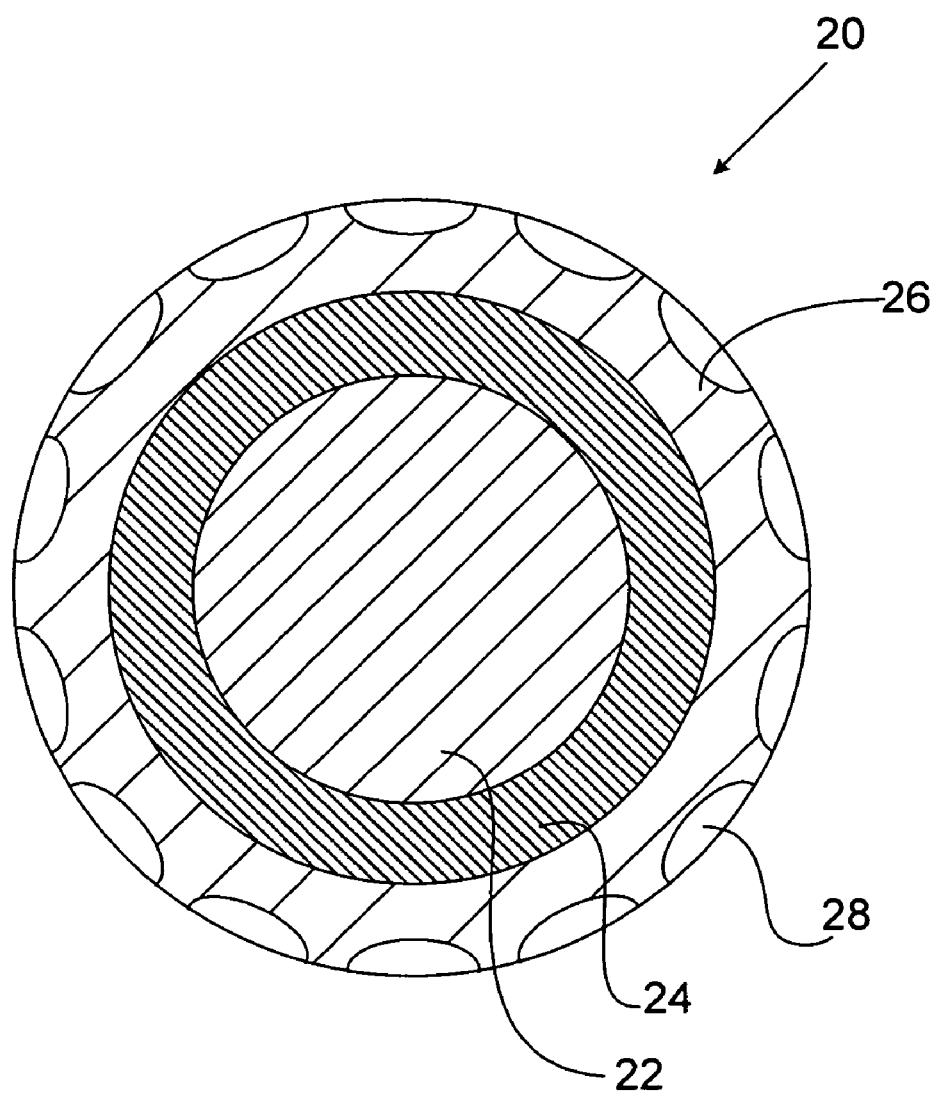
FIG. 2 is a schematic cross section of a three-piece golf ball.

FIG. 2 illustrates a 3-piece golf ball 20 comprising a core 22, an intermediate layer 24 and an outer cover layer 26. Golf ball 20 also typically includes plural dimples 28 formed in the outer cover layer 26 and arranged in various desired patterns. Although FIGS. 1 and 2 illustrate only two- and three-piece golf ball constructions, golf balls of the present invention may comprise from 0 to at least 5 intermediate layer(s), preferably from 0 to 3 intermediate layer(s), more preferably from 1 to 3 intermediate layer(s), and most preferably 1 to 2 intermediate layer(s).

The present invention can be used to form golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.670 inches to about 1.800 inches. Oversize golf balls with diameters above about 1.760 inches to as big as 2.75 inches also are within the scope of the invention.

A. Core

Ball cores of the present invention have a diameter of from about 0.5 to about 1.62 inches, preferably from about 0.7 to about 1.60 inches, more preferably from about 1 to about 1.58 inches, yet more preferably from about 1.20 to about 1.54 inches, and most preferably from about 1.40 to about 1.52 inches.

In another preferred embodiment, the golf ball core has at least one core layer on the center core, the layer having a thickness of from about 0.01 inch to about 1.14 inches, preferably from about 0.02 inch to about 1.12 inches, more preferably from about 0.03 inch to about 1.10 inches and most preferably from about 0.04 inch to about 1 inch.

In still another embodiment, two-piece balls are disclosed comprising a core and a cover having a thickness of from about 0.01 to about 0.20 inch, preferably from about 0.02 to about 0.15 inch, more preferably from about 0.03 to about 0.10 inch and most preferably from about 0.03 to about 0.07 inch. The cover typically has a hardness greater than about 25, preferably greater than about 30, and typically greater than about 40 Shore D. The ball typically has a PGA ball compression greater than about 40, preferably greater than about 50, more preferably greater than about 60, most preferably greater than about 70.

The golf ball cores of the present invention typically have a PGA compression of from about 30 to about 190, preferably from about 40 to about 160, typically from about 50 to about 130, and most preferably from about 60 to about 100.

The Shore D hardness of the core center and core layers made according to the present invention may vary from about 10 to about 90, typically from about 20 to about 80, and even more typically from about 30 to about 70.

B. Intermediate Layer(s) and Cover Layer

In one preferred embodiment, the golf ball of the present invention is a multi-piece ball having at least one layer comprising a polymer-peptizer composition as disclosed herein.

In another preferred embodiment, the golf ball of the present invention is a three-piece ball having a core and/or at least one layer comprising a polymer-peptizer composition as disclosed herein.

In yet another preferred embodiment of the present invention, the golf ball of the present invention is a four-piece ball having a core and/or at least one layer comprising a polymer-peptizer composition as disclosed herein.

The one or more intermediate layers of the golf balls of the present invention has a thickness of from about 0.01 to about 0.20 inch, preferably from about 0.02 to about 0.15 inch, more preferably from about 0.03 to about 0.10 inch and most preferably from about 0.03 to about 0.06 inch.

The one or more intermediate layers of the golf balls of the present invention also has a Shore D hardness greater than about 25, preferably greater than about 30, and typically greater than about 40.

The one or more intermediate layers of the golf balls of the present invention also has a flexural modulus from about 5 to about 500 kpsi, preferably from about 15 to about 300 kpsi, more preferably from about 20 to about 200 kpsi, and most preferably from about 25 to about 100 kpsi.

The cover layer of the balls of the present invention has a thickness of from about 0.01 to about 0.10 inch, preferably from about 0.02 to about 0.08 inch, more preferably from about 0.03 to about 0.07 inch.

The cover layer of the balls of the present invention has a Shore D hardness of from about 30 to about 75, preferably from about 30 to about 70, more preferably from about 45 to about 65.

The coefficient of restitution (COR) is an important physical attribute of golf balls. The coefficient of restitution is the ratio of the relative velocity between two objects after direct impact to the relative velocity before impact. As a result, the COR can vary from 0 to 1, with 1 being a perfectly or completely elastic collision and 0 being a perfectly or completely inelastic collision. Since the COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/sec to 180 ft/sec. As the ball travels toward the steel plate, it activates each light screen so that the time at each light screen is measured. This provides an incoming time period proportional to the ball's incoming velocity. The ball impacts the steel plate and rebounds through the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

Another COR measuring method uses a titanium disk. The titanium disk, intending to simulate a golf club, is circular, has a diameter of about 4 inches, and has a mass of about 200 grams. The impact face of the titanium disk also may be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen, so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. The COR can be calculated from the ratio of the outgoing time period to the incoming time period along with the mass of the disk (Me) and ball (Mb): $COR=(Tout/Tin)\times(Me+Mb)+MbMe$.

The COR depends on the golf ball construction as well as the chemical composition of the various layers. Peptizers are added to polymeric compositions, particularly compositions comprising unsaturated polymers, to desirably affect one or more physical properties of such compositions while substantially maintaining COR values. For example, compositions made without using a peptizer had COR values of 0.787, 0.809 and 0.803, whereas the COR value for the same composition made using 2,3,5,6-tetrachloropyridinethiol remained essentially constant with COR values of 0.791, 0.813 and 0.806, respectively, and at the same time the core compression decreased. This was unexpected as the general trend in that typically COR decreases with decreasing core compression). Thus use of the peptizers of the present invention provides the ability to maintain COR to maximize golf ball performance while allowing for additional adjustments in ball layer material properties.

III. Polymer-Peptizer Compositions

Certain disclosed embodiments of the present invention concern compositions comprising a polymer or polymer precursor, particularly an unsaturated polymer or unsaturated polymer precursor (polymer and polymer precursor are collectively referred to herein as polymer, unless context indicates otherwise), and an effective amount of a peptizer comprising a heteroaryl compound, a heterocycle other than morpholine, an organic sulfur compound comprising at least one heteroatom conjugated to a functional group bearing a sulfur atom, and combinations thereof. Alternatively, a first composition comprising a polymer or polymer precursor, particularly an unsaturated polymer or polymer precursor, and an effective amount of one or more peptizers comprising a heteroaryl compound, a heterocycle other than morpholine, an organic sulfur compound comprising at least one heteroatom conjugated to a functional group bearing a sulfur atom, and combinations thereof, can be combined with at least one additional polymer or polymer precursor to form a second composition that is useful for making a golf ball layer. Disclosed polymer and/or polymer precursor/peptizer compositions also can be combined with one or more additional materials, now known or hereafter developed, useful for making golf balls. A partial list of such material includes, without limitation, cross-linking agents, such as sulfur compounds, peroxides, azides, maleimides, e-beam radiation, gamma-radiation; co-cross-linking agent or agents, such as an agent comprising zinc or magnesium salts of an unsaturated fatty acid having from about 3 to about 8 carbon atoms; a base resin; an accelerator; a UV stabilizer; a photostabilizer; a photoinitiator; a co-initiator; an antioxidant; a colorant; a dispersant; a mold release agent; a processing aid; a fiber; a filler, such as a density adjusting filler, a nano-filler, an inorganic filler, and an organic filler; and any and all combinations thereof. The peptizers are used in amounts effective to achieve a desired result. While this amount can vary, "effective amount" typically refers to an amount greater than 0 part to about 10 parts, more typically from about 0.1 part to about 5 parts, by weight of peptizer per 100 parts by weight of the polymer.

Disclosed compositions also often include a cross-linking agent. The amount of the cross linking agent used also can vary, but typically is an amount of greater than 0 to less than about 5 part, more typically less than about 4 part, and most typically less than about 3 part, by weight of the cross-linking agent per 100 parts by weight of the polymer.

A. Unsaturated Polymers

Any process able polymeric material, or mixture of polymeric materials, that is useful for forming a golf ball core or layer that is now known or hereafter developed, and which can be advantageously modified by the addition of an effective amount of a peptizer comprising a heteroaryl compound, a heterocycle other than morpholine, an organic sulfur compound comprising at least one heteroatom conjugated to a functional group bearing a sulfur atom, and combinations thereof, can be used to form useful compositions of the present invention. Typically the processable polymeric material or mixture of polymeric materials comprises an unsaturated polymer or polymer precursor. Unsaturated polymers suitable for use in the golf balls of the present invention include any polymeric material having unsaturation, either hydrocarbon or non-hydrocarbon, capable of participating in a cross-linking reaction initiated by some means, such as thermally, chemically, by irradiation, or by a combination of these methods. Non-limiting examples of suitable classes of unsaturated polymers include synthetic and natural rubbers, polyalkenamers, olefinic thermoplastic elastomers, and combinations thereof. Particular examples of such polymers (or polymer precursors used to make such polymers) include, without limitation, 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer, styrene-isoprene-styrene block copolymer, nitrile rubber, silicone rubber, and polyurethane, as well as mixtures of these. These and other exemplary unsaturated polymers are discussed further below.

1. Synthetic and Natural Rubbers

Traditional rubber components used in golf ball applications can be used to make golf balls according to the present invention including, without limitation, both natural and synthetic rubbers, such as cis-1,4-polybutadienes, trans-1,4-polybutadienes, 1,2-polybutadienes, cis-polyisoprenes, trans-polyisoprenes, polychloroprenes, polybutylenes, styrene-butadiene rubbers, styrene-butadiene-styrene block copolymers and partially and fully hydrogenated equivalents, styrene-isoprene-styrene block copolymers and partially and fully hydrogenated equivalents, nitrile rubbers, silicone rubbers, and polyurethanes, as well as mixtures of these materials. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be purchased, if commercially available, or synthesized by methods now known or hereafter developed, including using rare earth-based catalysts, nickel-based catalysts, or cobalt-based catalysts, that conventionally are used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, and most preferably from about 2.2 to about 3.2. The polybutadiene rubbers have a Mooney viscosity ($ML_{1+4}$ (100° C.)) of from about −10 to about 80, preferably from about 20 to about 70, even more preferably from about 30 to about 60, and most preferably from about 35 to about 50. "Mooney viscosity" refers to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the present invention, are atactic 1,2-polybutadienes, isotactic 1,2-polybutadienes, and syndiotactic 1,2-polybutadienes. Syndiotactic 1,2-polybutadienes (syndiotactic polymers include alternating base units that are enantiomers of each other) having crystallinity suitable for use as an unsaturated polymer in compositions within the scope of the present invention are polymerized from a 1,2-addition of butadiene. Golf balls within the scope of the present invention include syndiotactic 1,2-polybutadienes having crystallinity and greater than about 70% of 1,2-bonds, more preferably greater than about 80% of 1,2-bonds, and most preferably greater than about 90% of 1,2-bonds. Also, golf balls within the scope of the present invention not only have such crystallinity but also have a mean molecular weight of between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

As with all disclosed components, the poly(1,4-butadiene) rubbers can be blended with other materials as desired. For example, the poly(1,4-butadiene) rubbers can be blended with natural rubber, polyisoprene rubber, styrene-butadiene rubber, or the like.

2. Polyalkenamers

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Degussa AG of Dusseldorf, Germany, and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer for use in the practice of the invention has a trans content of approximately 80%; however, compounds having other ratios of the cis- and trans-isomeric forms of the polyalkenamer also can be obtained by blending available products for use in the invention.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5% to about 70%, preferably from about 6% to about 50%, more preferably from about from 6.5% to about 50%, even more preferably from about from 7% to about 45%.

More preferably, the polyalkenamer rubber used in the present invention is a polymer prepared by polymerization of cyclooctene to form a trans-polyoctenamer rubber as a mixture of linear and cyclic macromolecules.

3. Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, and VYRAM by Advanced Elastomeric Systems of Houston, Tex., and SARLINK by DSM of Haarlen, the Netherlands.

A preferred group of polymers for making the presently disclosed compositions includes polybutadienes, polyisoprenes, butadiene copolymers, isoprene copolymers, polyalkenamers, and mixtures thereof.

B. Peptizers

Peptizers of the present invention typically are aromatic or conjugated peptizers comprising one or more heteroatoms, such as nitrogen, oxygen and/or sulfur. More typically, peptizers of the present invention are heteroaryl or heterocyclic compounds (other than the morpholine-type peptizers represented by 4,4'dithio-dimorpholine, as disclosed in U.S. application Ser. Nos. 10/662,619, 10/662,626, 10/662,628 and 10/662,719, entitled "Golf Balls Incorporating Peptizers and Method of Manufacture," which are incorporated herein by reference) having at least one heteroatom, and potentially plural heteroatoms, where the plural heteroatoms may be the same or different. Suitable peptizers also may include one or more additional functional groups, such as halogens, particularly chlorine; a sulfur-containing moiety exemplified by thiols, where the functional group is sulfhydryl (—SH), thioether, where the functional group is —SR, disulfides, ($R_1$S—$SR_2$), etc.; and combinations of functional groups. A person of ordinary skill in the art also will appreciate that combinations of such peptizers also might be used to make disclosed compositions.

A first general structural formula depicting disclosed heteroaryl or heterocyclic peptizer embodiments is provided by Formula 1. Formula 1 concerns cyclic peptizers having at least one heteroatom, A, typically nitrogen, oxygen, or sulfur, and most typically nitrogen, in an aromatic or conjugated system, as indicated by the dashed inner circle. The heteroaryl or heterocyclic peptizers of the present invention can include plural heteroatoms, indicated as $(A)_m$, where m is from 1 to n, where n is the number of atoms in the ring. Formula 1 indicates that at least one additional second ring, and perhaps plural such additional rings, either fused or otherwise linked to a first ring, is optionally present, as indicated by the dashed circle in Formula 1. R optionally is present, depending on the heteroatom and whether it can include an R group. If present, R typically is hydrogen or an aliphatic group.

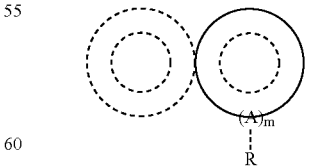

Formula 1

Structural chemical formulas provided herein may not depict all bonds for all atoms represented by such formulas. Additional atoms or functional groups may be bonded to atoms that do not have a full complement of bonds depicted to form suitable peptizer compounds. These atoms or groups typically are independently hydrogen, halogen, or aliphatic groups, particularly alkyl groups.

Heteroaryl or heterocyclic peptizers of the present invention include a ring having from about 3 atoms to at least about 10 ring atoms, more typically from about 4 to about 7 ring atoms, and most typically from about 5 to about 6 ring atoms. Disclosed heteroaryl or heterocyclic peptizers can have linked or fused rings; each of the plural rings may have the same number of atoms per ring or a different number of atoms per ring; and one or more of the rings can include one or more heteroatoms; e.g. nitrogen. Compounds comprising nitrogen may have the one or more nitrogen atoms double bonded within the ring, such as to a carbon atom or to another nitrogen atom. Alternatively, the nitrogen atom may include a substituent, the optional presence thereof being indicated by a dashed bond to an R group substituent, which typically is hydrogen or an aliphatic group, typically an alkyl group having 10 or fewer carbon atoms.

A person of ordinary skill in the art will appreciate that disclosed peptizers need not by cyclic, nor aromatic. Acyclic conjugated systems comprising a heteroatom also can function appropriately as peptizers. These conjugated systems also may include a sulfur moiety, such as a thiol or disulfide, and if so satisfy Formula 2 or Formula 3.

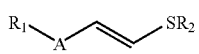

Formula 2

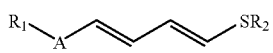

Formula 3

With reference to Formulas 2 and 3, A is a heteroatom, typically nitrogen, oxygen, or sulfur, and most typically nitrogen. $R_1$ generally is hydrogen or an aliphatic group, more typically alkyl, alkenyl or alkynyl groups having 10 or fewer carbon atoms. Disclosed peptizer embodiments typically include at least one sulfur moiety, indicated as —$SR_2$. $R_2$ independently is hydrogen, sulfur (e.g., —S—S—$R_3$ where $R_3$ is hydrogen, an aliphatic group, or defines a cyclic organic compound) or an aliphatic group, more typically an alkyl, alkenyl or alkynyl group having 10 or fewer carbon atoms, with exemplary functional groups including, for example, sulfhydryl, thioether, disulfides, etc. $R_1$ and $R_2$ also can be bonded to other atoms along the chain, or to each other, to form a cyclic, conjugated system.

Formula 2 indicates that disclosed peptizers include at least one site of unsaturation, which is exemplified by the double bond depicted by Formula 2. Formula 3 indicates that the compounds can have at least two sites of unsaturation. A person of ordinary skill in the art will appreciate that suitable peptizers may have more than two sites of unsaturation. Moreover, the site of unsaturation can be a carbon-carbon double bond or a carbon-carbon triple bond. The site of unsaturation also may include an atom other than carbon, such as oxygen or sulfur in a carbonyl (—C=O, —C=S) or nitrogen in an imine (—N=C—). The functional group also can exist as a tautomer. For example, with reference to Formulas 2 and 3, compounds having A=oxygen and $R_1$=to hydrogen define an enol that may tautomerize to the keto form.

Heteroaryl or heterocyclic peptizers of the present invention also typically satisfy Formula 4

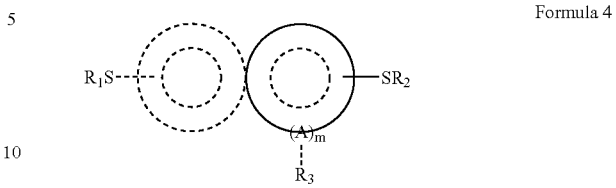

Formula 4 where A is a heteroatom, typically nitrogen, oxygen, or sulfur, and most typically nitrogen. The heteroaryl or heterocyclic peptizers of the present invention can include plural heteroatoms, indicated as $(A)_m$, where m is from 1 to n, where n is the number of atoms in the ring. $R_1$-$R_2$ are the same or different, and are independently hydrogen, sulfur (e.g., —S—S—$R_4$ where $R_4$ is hydrogen, an aliphatic group, or defines a cyclic organic compound) and aliphatic groups. The relative location of the sulfur moiety to the at least one heteroatom in the ring or in a conjugated system, as well as the relationship of any two moieties on a ring or in a conjugated system, can vary, e.g. from a 1-2, 1-3, 1-4, etc. relationship. $R_3$ optionally is present, depending on the heteroatom and whether it can include an $R_3$ group, but if present $R_3$ typically is hydrogen or an aliphatic group.

Disclosed heteroaryl or heterocyclic peptizers also may be substituted, and these compounds generally satisfy the following Formula 5.

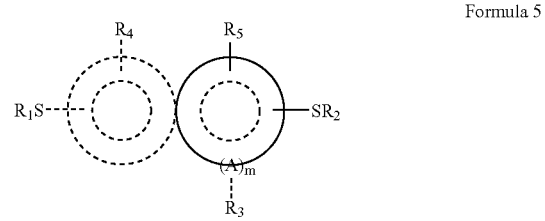

Formula 5

With reference to Formula 5, A is a heteroatom, typically nitrogen, oxygen, or sulfur, and most typically nitrogen. The heteroaryl or heterocyclic peptizers of the present invention can include plural heteroatoms, indicated as $(A)_m$, where m is from 1 to n, where n is the number of atoms in the ring. $R_1$-$R_2$ are the same or different, and are independently hydrogen, sulfur (e.g., —S—S—$R_4$ where $R_4$ is hydrogen, an aliphatic group, or defines a cyclic organic compound) and aliphatic groups. $R_3$ is optionally present, depending on the heteroatom and whether it can include an $R_3$ group. If present, $R_3$ typically is hydrogen or an aliphatic group. $R_4$ and $R_5$ are the same or different, and typically are independently hydrogen, halogen, and aliphatic groups, particularly alkyl groups.

A preferred class of peptizers according to the present invention is the 6-membered ring, nitrogen-based heteroaryl compounds illustrated by general structural Formula 6.

Formula 6

With reference to Formula 6, V—Z may be the same or different, and are independently carbon and heteroatoms, including without limitation, nitrogen, oxygen and sulfur, and preferably are independently carbon and nitrogen. One or more rings positions may include a substituent R, represented as being present in the alternative by the dashed bond, and being positionably variable as represented by the dashed bond being drawn to a ring bond and not an atom. R typically is halogen, sulfur-bearing moieties, such as sulfhydryl or disulfide, aliphatic groups, typically lower alkyl groups, and combinations thereof. The number of R groups also can vary as indicated by "n," where n can vary from 1-5. If a ring atom does not include an R group, then it may be bonded to a hydrogen atom, as would be understood by a person of ordinary skill in the art.

Formula 7 is a more specific, but still general, structural chemical formula depicting suitable 6-membered ring, nitrogen-based heteroaryl peptizers of the present invention.

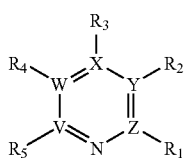

Formula 7

As with Formula 6, V—Z of Formula 7 may be the same or different, and are independently carbon and heteroatoms, including without limitation, nitrogen, oxygen and sulfur, and preferably are independently carbon and nitrogen. $R_1$-$R_5$ typically are hydrogen, halogen, sulfur-bearing moieties, such as sulfhydryl or disulfide, aliphatic groups, typically lower alkyl groups, and combinations thereof.

Exemplary nitrogen-based, heteroaryl compounds include pyridine-based compounds, exemplified by Formula 8; diazine compounds, such as pyrimidine- and pyradazine-based compounds, exemplified by Formulas 9-11; and triazine-based compounds, exemplified by Formula 12. Again, with reference to Formulas 8-12, $R_1$-$R_5$ typically are hydrogen, halogen, sulfur-bearing moieties, such as sulfhydryl or disulfide, aliphatic groups, typically lower alkyl groups, and combinations thereof.

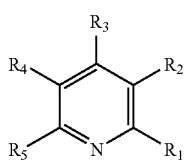

Formula 8

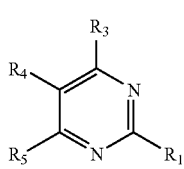

Formula 9

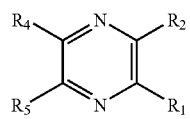

Formula 10

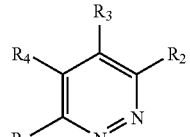

Formula 11

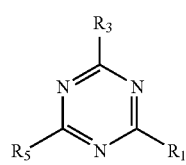

Formula 12

With reference to Formulas 8-12, $R_1$-$R_5$ may be the same or different and typically are independently hydrogen, lower aliphatic, typically lower alkyl, most typically C1 to C8 alkyl groups, halogen, particularly chlorine, sulfur-containing moieties, particularly sulfhydryl or disulfide, and may be other functional groups, such as carbonyl, carboxyl and/or sulfonate.

Working embodiments typically have used halogenated, pyridine-based thiol peptizers. These peptizers are exemplified by 2,3,5,6-tetrachloro-4-pyridinethiol, shown below.

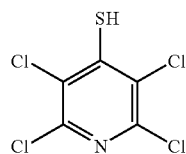

2,3,5,6-tetrachloro-4-pyridinethiol

Peptizers of the present invention can be used alone, in combination, and in combination with other known peptizers, such as an organic, sulfur-bearing compound and/or its metal or non-metal salt. Examples, without limitation, of organic, sulfur-bearing peptizer compounds include thiophenols, such as pentachlorothiophenol, 4-butyl-o-thiocresol, 4 t-butyl-p-thiocresol, 2-benzamidothiophenol, thiocarboxylic acids, such as thiobenzoic acid, 4,4'dithio-dimorpholine, sulfides, such as dixylyl disulfide, dibenzoyl disulfide, dibenzothiazyl disulfide, di(pentachlorophenyl) disulfide, dibenzamido diphenyldisulfide (DBDD), and alkylated phenol sulfides, such as VULTAC marketed by Atofina Chemicals, Inc. of Philadelphia, Pa.

Compounds represented by Formulas 1-12, as well as known peptizers, also can be used as salts. Any suitable salt can be used, including metal salts of such compounds, non-metal salts of such compounds, and mixed metal and non-metal salts of such compounds. Specific examples of metals useful for forming metal salts of disclosed and known peptizers include, without limitation, sodium, potassium, lithium, magnesium, calcium, barium, cesium and zinc salts, with zinc salts currently being preferred. Examples of non-metal salts of disclosed and known peptizers include, without limitation, ammonium salts, where the ammonium cation has the general formula [NR$_1$R$_2$R$_3$R$_4$]$^+$ where R$_1$, R$_2$, R$_3$ and R$_4$ are hydrogen, a C$_1$-C$_{20}$ aliphatic, cycloaliphatic or aromatic moiety, and any and all combinations thereof, with the preferred ammonium cation being NH$^{4+}$.

The peptizer, if employed to manufacture golf balls of the present invention, is present in an amount effective to achieve the desired result, which effective amount typically is from about 0.01 part to about 10 parts by weight, preferably from about 0.10 part to about 7 parts by weight, more preferably from about 0.15 part to about 5 parts by weight per 100 parts by weight of the polymer component.

C. Cross-Linking Agents

Any crosslinking or curing system typically used for rubber crosslinking may be used to crosslink the disclosed polymer and/or polymer precursor/peptizer compositions of the present invention. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used including, for example, tert-butyl perbenzoate and tert-butyl cumyl peroxide. Peroxides incorporating carboxyl groups also, are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl) benzene; t-butylperoxybenzoate; 2,5-dimethyl-2,5-di-(t-butylperoxy)hexyne-3, such as Trigonox 145-45B, marketed by Akzo Nobel Polymer Chemicals of Chicago, Ill.; 1,1-bis (t-butylperoxy)-3,3,5tri-methylcyclohexane, such as Varox 231-XL, marketed by R.T. Vanderbilt Co., Inc., of Norwalk, Conn.; and di-(2,4-dichlorobenzoyl)peroxide.

The cross-linking agents are blended with the polymeric material in effective amounts, which typically vary in total amounts of from about 0.05 part to about 5 parts, more preferably from about 0.2 part to about 3 parts, and most preferably from about 0.2 part to about 2 parts, by weight of the cross-linking agents per 100 parts by weight of the disclosed polymer and/or polymer precursor/peptizer compositions in the present invention Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the disclosed polymer and/or polymer precursor/peptizer compositions in the present invention to radiation also can serve as a cross-linking agent. Radiation can be applied to the disclosed polymer and/or polymer precursor/peptizer compositions by any known method, including using microwave, UV, electron-beam, or gamma-radiation. Additives may also be used to improve radiation-induced crosslinking of the disclosed polymer and/or polymer precursor/peptizer compositions in the present invention D. Co-Cross-Linking Agent The disclosed polymer and/or polymer precursor/peptizer compositions in the present invention may also be blended with a co-cross-linking agent. For example, the co-cross linking agent which may be a metal salt of an unsaturated carboxylic acid. Examples of these include zinc and magnesium salts of unsaturated fatty acids having from about 3 to about 8 carbon atoms, such as acrylic acid, methacrylic acid, maleic acid, fumaric acid and palmitic acid, with the zinc salts of acrylic and methacrylic acid being preferred, and with zinc diacrylate being most preferred. The unsaturated carboxylic acid metal salt can be blended in the disclosed polymer and/or polymer precursor/peptizer compositions either as a preformed metal salt, or by introducing an α,β-unsaturated carboxylic acid and a metal oxide or hydroxide into the disclosed polymer and/or polymer precursor/peptizer compositions, and allowing them to react to form the metal salt. The unsaturated carboxylic acid metal salt can be blended in any desired amount, but preferably in amounts of from about 10 parts to about 100 parts by weight of the unsaturated carboxylic acid per 100 parts by weight of the disclosed polymer and/or polymer precursor/peptizer compositions in the present invention E. Accelerators The disclosed polymer and/or polymer precursor/peptizer compositions of the present invention also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate: accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The disclosed polymer and/or polymer precursor/peptizer compositions can further incorporate from about 0.1 part to about 10 parts by weight of the accelerator per 100 parts by weight of the disclosed polymer and/or polymer precursor/peptizer composition. More preferably, the ball composition can further incorporate from about 0.2 part to about 5 parts, and most preferably from about 0.5 part to about 1.5 parts, by weight of the accelerator per 100 parts by weight of the disclosed polymer and/or polymer precursor/peptizer compositions.

IV. Additional Polymeric Materials

The following polymeric materials are provided solely as examples of materials useful for forming golf ball cores, intermediate layers, and/or cover layers. These materials can be used in combination with the disclosed peptizers if such compositions provide a desired composition. Alternatively, the following polymeric materials can be used in combination with a first polymer composition that includes a peptizer. As yet another alternative, the following polymeric materials may be used to make one or more golf ball layers that does not include the disclosed peptizers, but where at least one ball layer does include at least one disclosed peptizer. A person of ordinary skill in the art will recognize that the present invention is not limited solely to those materials listed herein by way of example. Moreover, a person of ordinary skill in the art also will recognize that various combinations of such materials can be used to form the core, intermediate layer(s) and/or outer cover layer.

Additional guidance for selecting materials useful for making golf balls according to the disclosed embodiments is provided by considering those physical properties desirable for making golf balls. In addition to the exemplary list of materials provided herein, a person of ordinary skill in the art might consider compression, hardness, density, flexural modulus, elasticity, COR, impact durability, tensile properties, melt flow index, acoustic behavior, compatibility, processability, etc., in view of values stated herein for such properties, values that are typical in the field, or values that otherwise would be known to a person of ordinary skill in the field.

A. General Description of Polymeric Materials

Polymeric materials generally considered useful for making golf balls according to the process of the present invention include, without limitation, synthetic and natural rubbers, thermoset polymers such as thermoset polyurethanes and thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic copolymers, functionalized styrenic copolymers, functionalized styrenic terpolymers, styrenic terpolymers, cellulosic polymers, liquid crystal polymers (LCP), ethylene-propylene-diene terpolymers (EPDM), ethylene-vinyl acetate copolymers (EVA), ethylene-propylene copolymers, ethylene vinyl acetates, polyureas, and polysiloxanes and any and all combinations thereof.

More specific examples of particular polymeric materials useful for making golf ball cores, optional intermediate layer(s) and outer covers, again without limitation, are provided below.

B. Polyalkenamers

Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see *Rubber Chem. & Tech.*, Vol. 47, page 511-596, 1974, which is incorporated herein by reference. Polyoctenamer rubbers are commercially available from Degussa AG of Dusseldorf, Germany, and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

The polyalkenamer rubber preferably contains from about 50 to about 99, preferably from about 60 to about 99, more preferably from about 65 to about 99, even more preferably from about 70 to about 90 percent of its double bonds in the trans-configuration. The preferred form of the polyalkenamer for use in the practice of the invention has a trans content of approximately 80%; however, compounds having other ratios of the cis- and trans-isomeric forms of the polyalkenamer also can be obtained by blending available products for use in the invention.

The polyalkenamer rubber has a molecular weight (as measured by GPC) from about 10,000 to about 300,000, preferably from about 20,000 to about 250,000, more preferably from about 30,000 to about 200,000, even more preferably from about 50,000 to about 150,000.

The polyalkenamer rubber has a degree of crystallization (as measured by DSC secondary fusion) from about 5% to about 70%, preferably from about 6% to about 50%, more preferably from about from 6.5% to about 50%, even more preferably from about from 7% to about 45%.

More preferably, the polyalkenamer rubber used in the present invention is a polymer prepared by polymerization of cyclooctene to form a trans-polyoctenamer rubber as a mixture of linear and cyclic macromolecules.

Prior to its use in the golf balls of the present invention, the polyalkenamer rubber may be further formulated with one or more of the following blend components:

1. Polyalkenamer Cross-Linking Agents

Any crosslinking or curing system typically used for rubber crosslinking may be used to crosslink the polyalkenamer rubber used in the present invention. Satisfactory crosslinking systems are based on sulfur-, peroxide-, azide-, maleimide- or resin-vulcanization agents, which may be used in conjunction with a vulcanization accelerator. Examples of satisfactory crosslinking system components are zinc oxide, sulfur, organic peroxide, azo compounds, magnesium oxide, benzothiazole sulfenamide accelerator, benzothiazyl disulfide, phenolic curing resin, m-phenylene bis-maleimide, thiuram disulfide and dipentamethylene-thiuram hexasulfide.

More preferable cross-linking agents include peroxides, sulfur compounds, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2,5-di-(t-butylperoxy)hexyne-3, such as Trigonox 145-45B, marketed by Akzo Nobel Polymer Chemicals of Chicago, Ill.; 1,1-bis(t-butylperoxy)-3,3,5tri-methylcyclohexane, such as Varox 231-XL, marketed by R.T. Vanderbilt Co., Inc., of Norwalk, Conn.; and di-(2,4-dichlorobenzoyl)peroxide.

The cross-linking agents are blended with the polymeric material in effective amounts, which typically vary in total amounts of from about 0.05 part to about 5 parts, more preferably about 0.2 part to about 3 parts, and most preferably about 0.2 part to about 2 parts, by weight of the cross-linking agents per 100 parts by weight of the polyalkenamer rubber.

Each peroxide cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}=0.1$ hr has a decomposition temperature of 138° C. and 2,5-dimethyl-2,5-di-(t-butylperoxy)hexyne-3 at $t_{1/2}=0.1$ hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the polyalkenamer rubber composition to radiation also can serve as a cross-linking agent. Radiation can be applied to the polyalkenamer rubber mixture by any known method, including using microwave UV, electron-beam, or gamma radiation. Additives may also be used to improve radiation-induced crosslinking of the polyalkenamer rubber.

2. Co-Cross-Linking Agent

The polyalkenamer rubber may also be blended with a co-cross-linking agent, which may be a metal salt of an unsaturated carboxylic acid. Examples of these include zinc and magnesium salts of unsaturated fatty acids having from about 3 to about 8 carbon atoms, such as acrylic acid, methacrylic acid, maleic acid, fumaric acid and palmitic acid, with the zinc salts of acrylic and methacrylic acid being preferred, and with zinc diacrylate being most preferred. The unsaturated carboxylic acid metal salt can be blended in the polyalkenamer rubber either as a preformed metal salt, or by introducing an α,β-unsaturated carboxylic acid and a metal oxide or hydroxide into the polyalkenamer rubber composition, and allowing them to react to form the metal salt. The unsaturated carboxylic acid metal salt can be blended in any desired amount, but preferably in amounts of about 10 parts to about 100 parts by weight of the unsaturated carboxylic acid per 100 parts by weight of the polyalkenamer rubber.

3. Accelerators

The polyalkenamer rubber composition also can comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in *The Vanderbilt Rubber Handbook:* 13$^{th}$ Edition (1990, R.T. Vanderbilt Co.), pp. 296-330, in *Encyclopedia of Polymer Science and Technology*, Vol. 12 (1970, John Wiley & Sons), pp. 258-259, and in *Rubber Technology Handbook* (1980, Hanser/Gardner Publications), pp. 234-236. Preferred accelerators include 2-mercaptobenzothiazole (MBT) and its salts.

The polyalkenamer rubber composition can further incorporate from about 0.1 part to about 10 parts by weight of the accelerator per 100 parts by weight of the polyalkenamer rubber. More preferably, the ball composition can further incorporate from about 0.2 part to about 5 parts, and most preferably from about 0.5 part to about 1.5 parts, by weight of the accelerator per 100 parts by weight of the polyalkenamer rubber.

C. Synthetic and Natural Rubbers

Traditional rubber components used in golf ball applications can be used to make golf balls according to the present invention including, without limitation, both natural and synthetic rubbers, such as cis-1,4-polybutadienes, trans-1,4-polybutadienes, 1,2-polybutadienes, cis-polyisoprenes, trans-polyisoprenes, polychloroprenes, polybutylenes, styrene-butadiene rubbers, styrene-butadiene-styrene block copolymers and partially and fully hydrogenated equivalents, styrene-isoprene-styrene block copolymers and partially and fully hydrogenated equivalents, nitrile rubbers, silicone rubbers, and polyurethanes, as well as mixtures of these materials. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be purchased, if commercially available, or synthesized by methods now known or hereafter developed, including using rare earth-based catalysts, nickel-based catalysts, or cobalt-based catalysts, that conventionally are used in this field. Polybutadiene obtained by using lanthanum rare earth-based catalysts usually employ a combination of a lanthanum rare earth (atomic number of 57 to 71) compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, and most preferably from about 2.2 to about 3.2. The polybutadiene rubbers have a Mooney viscosity (ML$_{1+4}$ (100° C.)) of from about -10 to about 80, preferably from about 20 to about 70, even more preferably from about 30 to about 60, and most preferably from about 35 to about 50. "Mooney viscosity" refers to an industrial index of viscosity as measured with a Mooney viscometer, which is a type of rotary plastometer (see JIS K6300). This value is represented by the symbol ML$_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C.

Examples of 1,2-polybutadienes having differing tacticity, all of which are suitable as unsaturated polymers for use in the present invention, are atactic 1,2-polybutadienes, isotactic 1,2-polybutadienes, and syndiotactic 1,2-polybutadienes. Syndiotactic 1,2-polybutadienes having crystallinity suitable for use as an unsaturated polymer in compositions within the scope of the present invention are polymerized from a 1,2-addition of butadiene. Golf balls within the scope of the present invention include syndiotactic 1,2-polybutadienes having crystallinity and greater than about 70% of 1,2-bonds, more preferably greater than about 80% of 1,2-bonds, and most preferably greater than about 90% of 1,2-bonds. Also, golf balls within the scope of the present invention not only have such crystallinity but also have a mean molecular weight of between from about 10,000 to about 350,000, more preferably between from about 50,000 to about 300,000, more preferably between from about 80,000 to about 200,000, and most preferably between from about 10,000 to about 150,000. Examples of suitable syndiotactic 1,2-polybutadienes having crystallinity suitable for use in golf balls within the scope of the present invention are sold under the trade names RB810, RB820, and RB830 by JSR Corporation of Tokyo, Japan. These have more than 90% of 1,2 bonds, a mean molecular weight of approximately 120,000, and crystallinity between about 15% and about 30%.

D. Thermoplastic Materials

1. Olefinic Thermoplastic Elastomers

Examples of olefinic thermoplastic elastomers include, without limitation, metallocene-catalyzed polyolefins, ethylene-octene copolymers, ethylene-butene copolymers, and ethylene-propylene copolymers all with or without controlled tacticity as well as blends of polyolefins having ethyl-propylene-non-conjugated diene terpolymers, rubber-based copolymers, and dynamically vulcanized rubber-based copolymers. Examples of such polymers that are commercially available include products sold under the trade names SANTOPRENE, DYTRON, VISTAFLEX, and VYRAM by Advanced Elastomeric Systems of Houston, Tex., and SARLINK by DSM of Haarlen, the Netherlands.

2. Co-Polyester Thermoplastic Elastomers

Examples of copolyester thermoplastic elastomers include polyether ester block copolymers, polylactone ester block copolymers, and aliphatic and aromatic dicarboxylic acid copolymerized polyesters. Polyether ester block copolymers are copolymers comprising polyester hard segments polymerized from a dicarboxylic acid and a low molecular weight diol, and polyether soft segments polymerized from an alkylene glycol having 2 to 10 atoms. Polylactone ester block copolymers are copolymers having polylactone chains instead of polyether as the soft segments discussed above for polyether ester block copolymers. Aliphatic and aromatic dicarboxylic copolymerized polyesters are copolymers of an acid component selected from aromatic dicarboxylic acids, such as terephthalic acid and isophthalic acid, and aliphatic acids having 2 to 10 carbon atoms with at least one diol component, selected from aliphatic and alicyclic diols having 2 to 10 carbon atoms. Blends of aromatic polyester and aliphatic polyester also may be used for these. Examples of these include products marketed under the trade names HYTREL by E.I. DuPont de Nemours & Company, and SKYPEL by S.K. Chemicals of Seoul, South Korea.

3. Other Thermoplastic Elastomers

Examples of other thermoplastic elastomers include multiblock, rubber-based copolymers, particularly those in which the rubber block component is based on butadiene, isoprene, or ethylene/butylene. The non-rubber repeating units of the copolymer may be derived from any suitable monomer, including meth(acrylate) esters, such as methyl methacrylate and cyclohexylmethacrylate, and vinyl arylenes, such as styrene. Styrenic block copolymers are copolymers of styrene with butadiene, isoprene, or a mixture of the two. Additional unsaturated monomers may be added to the structure of the styrenic block copolymer as needed for property modification of the resulting SBC/urethane copolymer. The styrenic block copolymer can be a diblock or a triblock styrenic polymer. Examples of such styrenic block copolymers are described in, for example, U.S. Pat. No. 5,436,295 to Nishikawa et al., which is incorporated herein by reference. The styrenic block copolymer can have any known molecular weight for such polymers, and it can possess a linear, branched, star, dendrimeric or combination molecular structure. The styrenic block copolymer can be unmodified by functional groups, or it can be modified by hydroxyl group, carboxyl group, or other functional groups, either in its chain structure or at one or more terminus. The styrenic block copolymer can be obtained using any common process for manufacture of such polymers. The styrenic block copolymers also may be hydrogenated using well-known methods to obtain a partially or fully saturated diene monomer block. Examples of styrenic copolymers include, without limitation, resins manufactured by Kraton Polymers (formerly of Shell Chemicals) under the trade names KRATON D (for styrene-butadiene-styrene and styrene-isoprene-styrene types), and KRATON G (for styrene-ethylene-butylene-styrene and styrene-ethylene-propylene-styrene types) and Kuraray under the trade name SEPTON. Examples of randomly distributed styrenic polymers include paramethylstyrene-isobutylene (isobutene) copolymers developed by ExxonMobil Chemical Corporation and styrene-butadiene random copolymers developed by Chevron Phillips Chemical Corporation.

Examples of other thermoplastic elastomers suitable as additional polymer components in the present invention include those having functional groups, such as carboxylic acid, maleic anhydride, glycidyl, norbonene, and hydroxyl functionalities. An example of these includes a block polymer having at least one polymer block A comprising an aromatic vinyl compound and at least one polymer block B comprising a conjugated diene compound, and having a hydroxyl group at the terminal block copolymer, or its hydrogenated product. An example of this polymer is sold under the trade name SEPTON HG-252 by Kuraray Company of Kurashiki, Japan. Other examples of these include: maleic anhydride functionalized triblock copolymer consisting of polystyrene end blocks and poly(ethylene/butylene), sold under the trade name KRATON FG 1901X by Shell Chemical Company; maleic anhydride modified ethylene-vinyl acetate copolymer, sold under the trade name FUSABOND by E.I. DuPont de Nemours & Company; ethylene-isobutyl acrylate-methacrylic acid terpolymer, sold under the trade name NUCREL by E.I. DuPont de Nemours & Company; ethylene-ethyl acrylate-methacrylic anhydride terpolymer, sold under the trade name BONDINE AX 8390 and 8060 by Sumitomo Chemical Industries; brominated styrene-isobutylene copolymers sold under the trade name BROMO XP-50 by Exxon Mobil Corporation; and resins having glycidyl or maleic anhydride functional groups sold under the trade name LOTADER by Elf Atochem of Puteaux, France.

4. Polyamides

Examples of polyamides within the scope of the present invention include resins obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as $\epsilon$-caprolactam or $\omega$-laurolactam; (3) polycondensation of an aminocarboxylic acid, such as 6-aminocaproic acid, 9-aminononanoic acid, 11-aminoundecanoic acid or 12-aminododecanoic acid; or (4) copolymerization of a cyclic lactam with a dicarboxylic acid and a diamine, and any combination of those Specific examples of suitable polyamides include polyamide 6; polyamide 11; polyamide 12; polyamide 4,6; polyamide 6,6; polyamide 6,9; polyamide 6,10; polyamide 6,12; PA12CX; PA12, IT; PPA; PA6, IT.

Non-limiting examples of suitable polyamides or copolymeric polyamides for use in the inner mantle and/or the outer mantle layer include those sold under the trademarks PEBAX, CRISTAMID and RILSAN marketed by ATOFINA Chemicals of Philadelphia, Pa.; GRILAMID marketed by EMS CHEMIE of Sumter, S.C.; TROGAMID marketed by Degusssa of Dusseldorf, Germany; and ZYTEL marketed by E.I. DuPont de Nemours & Co. of Wilmington, Del.

5. Polyamide Elastomer

Examples of polyamide elastomers within the scope of the present invention include polyether amide elastomers, which result from the copolycondensation of polyamide blocks having reactive chain ends with polyether blocks having reactive chain ends, including: 1) polyamide blocks of diamine chain ends with polyoxyalkylene sequences of dicarboxylic chain ends; 2) polyamide blocks of dicarboxylic chain ends with polyoxyalkylene sequences of diamine chain ends obtained by cyanoethylation and hydrogenation of polyoxyalkylene alpha-omega dihydroxylated aliphatic sequences known as polyether diols; and 3) polyamide blocks of dicarboxylic chain ends with polyether diols, the products obtained, in this particular case, being polyetheresteramides.

The polyamide blocks of dicarboxylic chain ends come, for example, from the condensation of alpha-omega aminocarboxylic acids of lactam or of carboxylic diacids and diamines in the presence of a carboxylic diacid which limits the chain length. The molecular weight of the polyamide sequences preferably is between about 300 and about 15,000, and more preferably between about 600 and about 5,000. The molecular weight of the polyether sequences preferably is between about 100 and about 6,000, and more preferably between about 200 and about 3,000.

The amide block polyethers also may comprise randomly distributed units. These polymers may be prepared by the simultaneous reaction of polyether and precursor of polyamide blocks.

For example, the polyether diol may react with a lactam (or alpha-omega amino acid) and a diacid which limits the chain in the presence of water. A polymer is obtained having mainly polyether blocks, polyamide blocks of very variable length, but also the various reactive groups having reacted in a random manner and which are distributed statistically along the polymer chain.

Suitable amide block polyethers include, without limitation, those disclosed in U.S. Pat. Nos. 4,331,786, 4,115,475, 4,195,015, 4,839,441, 4,864,014, 4,230,838, and 4,332,920, which are incorporated herein in their entireties by reference. The polyether may be, for example, a polyethylene glycol (PEG), a polypropylene glycol (PPG), or a polytetramethylene glycol (PTMG), also designated as polytetrahydrofurane (PTHF).

The polyether blocks may be along the polymer chain in the form of diols or diamines. However, for reasons of simplification, they are designated PEG blocks, or PPG blocks, or also PTMG blocks.

It is also within the scope of the disclosed embodiments that the polyether block comprises different units such as units, which derive from ethylene glycol, propylene glycol, or tetramethylene glycol.

The amide block polyether comprises at least one type of polyamide block and one type of polyether block. Mixing two or more polymers with polyamide blocks and polyether blocks also may be used. It also can comprise any amide structure made from the method described on the above.

Preferably, the amide block polyether is such that it represents the major component in weight, i.e., that the amount of polyamide which is under the block configuration and that which is eventually distributed statistically in the chain represents 50 weight percent or more of the amide block polyether. Advantageously, the amount of polyamide and the amount of polyether is in a ratio (polyamide/polyether) of about 1:1 to about 3:1.

One type of polyetherester elastomer is the family of Pebax, which are available from Elf-Atochem Company. Preferably, the choice can be made from among Pebax 2533, 3533, 4033, 1205, 7033, and 7233. Blends or combinations of Pebax 2533, 3533, 4033, 1205, 7033, and 7233 also can be prepared, as well. Pebax 2533 has a hardness of about 25 shore D (according to ASTM D-2240), a Flexural Modulus of about 2.1 kpsi (according to ASTM D-790), and a Bayshore resilience of about 62% (according to ASTM D-2632). Pebax 3533 has a hardness of about 35 shore D (according to ASTM D-2240), a Flexural Modulus of about 2.8 kpsi (according to ASTM D-790), and a Bayshore resilience of about 59% (according to ASTM D-2632). Pebax 7033 has a hardness of about 69 shore D (according to ASTM D-2240) and a Flexural Modulus of about 67 kpsi (according to ASTM D-790). Pebax 7333 has a hardness of about 72 shore D (according to ASTM D-2240) and a Flexural Modulus of about 107 kpsi (according to ASTM D-790).

Specific examples of suitable polyamides also include Nylon 6, Nylon 66, Nylon 610, Nylon 11, Nylon 12, copolymerized Nylon, Nylon MXD6, and Nylon 46.

6. Polyurethanes

Another example of an additional polymer component includes polyurethanes, which are the reaction product of a diol or polyol and an isocyanate, with or without a chain extender. Polyurethanes are described in the patent literature, and some are known for use in making golf ball cores. See, for example, Vedula et al., U.S. Pat. No. 5,959,059.

Isocyanates used for making the urethanes of the present invention encompass diisocyanates and polyisocyanates. Examples of suitable isocyanates include the following: trimethylene diisocyanates, tetramethylene diisocyanates, pentamethylene diisocyanates, hexamethylene diisocyanates, ethylene diisocyanates, diethylidene diisocyanates, propylene diisocyanates, butylene diisocyanates, bitolylene diisocyanates, tolidine isocyanates, isophorone diisocyanates, dimeryl diisocyanates, dodecane-1,12-diisocyanates, 1,10-decamethylene diisocyanates, cyclohexylene-1,2-diisocyanates, 1-chlorobenzene-2,4-diisocyanates, furfurylidene diisocyanates, 2,4,4-trimethyl hexamethylene diisocyanates 2,2,4-trimethyl hexamethylene diisocyanates, dodecamethylene diisocyanates, 1,3cyclopentane diisocyanates, 1,3-cyclohexane diisocyanates, 1,3-cyclobutane diisocyanates, 1,4-cyclohexane diisocyanates, 4,4'-methylenebis(cyclohexyl isocyanates), 4,4'-methylenebis(phenyl isocyanates), 1-methyl-2,4-cyclohexane diisocyanates, 1-methyl-2,6-cyclohexane diisocyanates, 1,3-bis (isocyanato-methyl)cyclohexanes, 1,6-diisocyanato-2,2,4,4-tetra-methylhexanes, 1,6-diisocyanato-2,4,4-tetra-trimethylhexanes, trans-cyclohexane-1,4-diisocyanates, 3-isocyanato-methyl-3,5,5-trimethylcyclohexyl isocyanates, 1-isocyanato-3,3,5-trimethyl-5-isocyanatomethylcyclohexanes, cyclohexyl isocyanates, dicyclohexylmethane 4,4'-diisocyanates, 1,4-bis(isocyanatomethyl) cyclohexanes, m-phenylene diisocyanate, m-xylylene diisocyanate, m-tetramethylxylylene diisocyanates, p-phenylene diisocyanate, p,p'-biphenyl diisocyanates, 3,3'-dimethyl-4,4'-biphenylene diisocyanates, 3,3'-dimethoxy-4,4'-biphenylene diisocyanates, 3,3'-diphenyl-4,4'-biphenylene diisocyanates, 4,4'-biphenylene diisocyanates, 3,3'-dichloro-4,4'-biphenylene diisocyanates, 1,5-naphthalene diisocyanates, 4-chloro-1,3-phenylene diisocyanates, 1,5-tetrahydronaphthalene diisocyanates, meta-xylene diisocyanates, 2,4-toluene diisocyanates, 2,4'-diphenylmethane diisocyanates, 2,4-chlorophenylene diisocyanates, 4,4'-diphenylmethane diisocyanates, p,p'-diphenylmethane diisocyanate, 2,4-tolylene diisocyanates, 2,6-tolylene diisocyanates, 2,2-diphenylpropane-4,4'-diisocyanate, 4,4'-toluidine diisocyanates, dianisidine diisocyanates, 4,4'-diphenyl ether diisocyanates, 1,3-xylylene diisocyanates, 1,4-naphthylene diisocyanates, azobenzene-4,4'-diisocyanates, diphenyl sulfone-4,4'-diisocyanates, triphenylmethane 4,4',4''-triisocyanates, isocyanatoethyl methacrylates, 3-isopropenyl-α,α-dimethylbenzyl-isocyanates, dichlorohexamethylene diisocyanates, ω,ω'-diisocyanato-1,4-diethylbenzenes, polymethylene polyphenylene polyisocyanates, polybutylene diisocyanates, isocyanurate modified compounds, and carbodiimide modified compounds, as well as biuret modified compounds of the above polyisocyanates. Each isocyanate may be used either alone or in combination with one or more other isocyanates. These isocyanate mixtures can include triisocyanates, such as biuret of hexamethylene diisocyanate and triphenylmethane triisocyanate, and polyisocyanates, such as polymeric diphenylmethane diisocyanate.

Polyols used for making the polyurethane in the copolymer include polyester polyols, polyether polyols, polycarbonate polyols and polybutadiene polyols. Polyester polyols are prepared by condensation or step-growth polymerization utilizing diacids. Primary diacids for polyester polyols are adipic acid and isomeric phthalic acids; Adipic acid is used for materials requiring added flexibility, whereas phthalic anhydride is used for those requiring rigidity. Some examples of polyester polyols include poly(ethylene adipate) (PEA), poly(diethylene adipate) (PDA), poly(propylene adipate) (PPA), poly(tetramethylene adipate) (PBA), poly(hexamethylene adipate) (PHA), poly(neopentylene adipate) (PNA), polyols composed of 3-methyl-1,5-pentanediol and adipic acid, random copolymer of PEA and PDA, random copolymer of PEA and PPA, random copolymer of PEA and PBA, random copolymer of PHA and PNA, caprolactone polyol obtained by the ring-opening polymerization of ε-caprolactone, and polyol obtained by opening the ring of β-methyl-δ-valerolactone with ethylene glycol can be used either alone or in a combination thereof. Additionally, polyester polyols may be composed of a copolymer of at least one of the following acids and at least one of the following glycols. The acids include terephthalic acid, isophthalic acid, phthalic anhydride, oxalic acid, malonic acid, succinic acid, pentanedioic acid, hexanedioic acid, octanedioic acid, nonanedioic acid, adipic acid, azelaic acid, sebacic acid, dodecanedioic acid, dimer acid (a mixture), ρ-hydroxybenzoate, trimellitic anhydride, ε-caprolactone, and β-methyl-δ-valerolactone. The glycols includes ethylene glycol, propylene glycol, butylene glycol, pentylene glycol, 1,4-butanediol, 1,5-pentanediol, 1,6-hexanediol, neopentylene glycol, polyethylene glycol, polytetramethylene glycol, 1,4-cyclohexane dimethanol, pentaerythritol, and 3-methyl-1,5-pentanediol.

Polyether polyols are prepared by the ring-opening addition polymerization of an alkylene oxide (e.g. ethylene oxide and propylene oxide) with an initiator of a polyhydric alcohol (e.g. diethylene glycol), which has an active hydrogen. Specifically, polypropylene glycol (PPG), polyethylene glycol (PEG) or propylene oxide-ethylene oxide copolymer can be obtained. Polytetramethylene ether glycol (PTMG) is prepared by the ring-opening polymerization of tetrahydrofuran, produced by dehydration of 1,4-butanediol or hydrogenation of furan. Tetrahydrofuran can form a copolymer with alkylene oxide. Specifically, tetrahydrofuran-propylene oxide copolymer or tetrahydrofuran-ethylene oxide copolymer can be formed. A polyether polyol may be used either alone or in a mixture.

Polycarbonate polyols are obtained by the condensation of a known polyol (polyhydric alcohol) with phosgene, chloroformic acid ester, dialkyl carbonate or diallyl carbonate. A particularly preferred polycarbonate polyol contains a polyol component using 1,6-hexanediol, 1,4-butanediol, 1,3-butanediol, neopentylglycol or 1,5-pentanediol. A polycarbonate polyol can be used either alone or in a mixture.

Polybutadiene polyols include liquid diene polymer containing hydroxyl groups, and an average of at least 1.7 functional groups, and may be composed of diene polymers or diene copolymers having 4 to 12 carbon atoms, or a copolymer of such diene with addition to polymerizable α-olefin monomer having 2 to 2.2 carbon atoms. Specific examples include butadiene homopolymer, isoprene homopolymer, butadiene-styrene copolymer, butadiene-isoprene copolymer, butadiene-acrylonitrile copolymer, butadiene-2-ethyl hexyl acrylate copolymer, and butadiene-n-octadecyl acrylate copolymer. These liquid diene polymers can be obtained, for example, by heating a conjugated diene monomer in the presence of hydrogen peroxide in a liquid reactant. A polybutadiene polyol can be used either alone or in a mixture.

Urethanes used to practice the present invention also may incorporate chain extenders. Non-limiting examples of these extenders include polyols, polyamine compounds, and mixtures of these. Polyol extenders may be primary, secondary, or tertiary polyols. Specific examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Suitable polyamines that may be used as chain extenders include primary, secondary and tertiary amines. Polyamines have two or more amine functional groups. Examples of polyamines include, without limitation: aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as 4,4'-methylene bis-2-chloroaniline, dimethylthio-2,4-toluene diamine, diethyl-2,4-toluene diamine, 2,2',3,3'-tetrachloro-4,4'-diaminophenyl methane, p,p'-methylenedianiline, p-phenylenediamine or 4,4'-diaminodiphenyl; and 2,4,6-tris(dimethylaminomethyl) phenol, and any and all combinations thereof. A chain extender may be used either alone or in a mixture.

7. Ethylenically Unsaturated Thermoplastic Elastomers

Another family of thermoplastic elastomers for use in the golf balls of the present invention are polymers of (i) ethylene and/or an alpha olefin; and (ii) an $\alpha,\beta$-ethylenically unsaturated $C_3$-$C_{20}$ carboxylic acid or anhydride, or an $\alpha,\beta$-ethylenically unsaturated $C_3$-$C_{20}$ sulfonic acid or anhydride or an $\alpha,\beta$-ethylenically unsaturated $C_3$-$C_{20}$ phosphoric acid or anhydride and, optionally iii) a $C_1$-$C_{10}$ ester of an $\alpha,\beta$-ethylenically unsaturated $C_3$-$C_{20}$ carboxylic acid or a $C_1$-$C_{10}$ ester of an $\alpha,\beta$-ethylenically unsaturated $C_3$-$C_{20}$ sulfonic acid or a $C_1$-$C_{10}$ ester of an $\alpha,\beta$-ethylenically unsaturated $C_3$-$C_{20}$ phosphoric acid.

Preferably, the alpha-olefin has from 2 to 10 carbon atoms and is preferably ethylene, and the unsaturated carboxylic acid is a carboxylic acid having from about 3 to 8 carbons. Examples of such acids include acrylic acid, methacrylic acid, ethacrylic acid, chloroacrylic acid, crotonic acid, maleic acid, fumaric acid, and itaconic acid, with acrylic acid and methacrylic acid being preferred. Preferably, the carboxylic acid ester of if present may be selected from the group consisting of vinyl esters of aliphatic carboxylic acids wherein the acids have 2 to 10 carbon atoms and vinyl ethers wherein the alkyl groups contain 1 to 10 carbon atoms.

Examples of such polymers suitable for use include, but are not limited to, an ethylene/acrylic acid copolymer, an ethylene/methacrylic acid copolymer, an ethylene/itaconic acid copolymer, an ethylene/maleic acid copolymer, an ethylene/methacrylic acid/vinyl acetate copolymer, an ethylene/acrylic acid/vinyl alcohol copolymer, and the like.

Most preferred are ethylene/(meth)acrylic acid copolymers and ethylene/(meth)acrylic acid/alkyl (meth)acrylate terpolymers, or ethylene and/or propylene maleic anhydride copolymers and terpolymers.

The acid content of the polymer may contain anywhere from 1 to 30 percent by weight acid. In some instances, it is preferable to utilize a high acid copolymer (i.e., a copolymer containing greater than 16% by weight acid, preferably from about 17 to about 25 weight percent acid, and more preferably about 20 weight percent acid).

Examples of such polymers which are commercially available include, but are not limited to, the Escor® 5000, 5001, 5020, 5050, 5070, 5100, 5110 and 5200 series of ethylene-acrylic acid copolymers sold by Exxon and the PRIMACOR® 1321, 1410, 1410-XT, 1420, 1430, 2912, 3150, 3330, 3340, 3440, 3460, 4311 and 4608 series of ethylene-acrylic acid copolymers sold by the Dow Chemical Company, Midland, Mich.

Also included are the bimodal ethylene/carboxylic acid polymers as described in U.S. Pat. No. 6,562,906, the entire contents of which are herein incorporated by reference. These polymers comprise ethylene/$\alpha,\beta$-ethylenically unsaturated $C_{3-8}$ carboxylic acid high copolymers, particularly ethylene (meth)acrylic acid copolymers and ethylene, alkyl (meth) acrylate, (meth)acrylic acid terpolymers, having molecular weights of about 80,000 to about 500,000 which are melt blended with ethylene/$\alpha,\beta$-ethylenically unsaturated $C_{3-8}$ carboxylic acid copolymers, particularly ethylene/(meth) acrylic acid copolymers having molecular weights of about 2,000 to about 30,000.

8. Ionomers

The core, cover layer and, optionally, one or more inner cover layers golf ball embodiments of the present invention may further comprise one or more ionomer resins. One family of such resins was developed in the mid-1960's, by E.I. DuPont de Nemours and Co., and sold under the trademark SURLYN®. Preparation of such ionomers is well known, for example see U.S. Pat. No. 3,264,272 (the entire contents of which are herein incorporated by reference). Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester also may be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $Cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of, for example, formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it also was well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers are typically defined as those ionomer resins with acrylic or methacrylic acid units present from 16 weight percent to about 35 weight percent in the polymer. Generally, such a high acid ionomer will have a flexural modulus from about 50,000 psi to about 125,000 psi.

Ionomer resins may further comprise a softening comonomer, present from about 10 weight percent to about 50 weight percent in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, many of which can be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y, wherein E is ethylene, X is a $C_3$ to $C_8$ $\alpha,\beta$-ethylenically unsaturated carboxylic acid, such as acrylic or methacrylic acid, and is present in an amount from about 2 to about 30 weight percent of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight percent of the E/X/Y copolymer, and wherein the acid moiety is neutralized from about 1% to about 90% to form an ionomer with a cation such as lithium, sodium, potassium, magnesium, calcium, barium, lead, tin, zinc or aluminum, or a combination of such cations.

The ionomer also may be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, potassium, zinc, calcium, magnesium, and a mixture of any these; and a low molecular weight component having a molecular weight of from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, potassium, zinc, calcium, magnesium, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers are prepared by mixing:

an ionomeric polymer comprising ethylene, from 5 to 25 weight percent (meth)acrylic acid, and from 0 to 40 weight percent of a (meth)acrylate monomer, the ionomeric polymer neutralized with metal ions selected from the group consisting of lithium, sodium, potassium, zinc, calcium, magnesium, and mixture of any these, and from about 5 to about 40 weight percent (based on the total weight of said modified ionomeric polymer) of one or more fatty acids or metal salts of said fatty acid, the metal selected from the group consisting of calcium, sodium, zinc, potassium, and lithium, barium and magnesium and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing:

a. a high molecular weight component having molecular weight of about 80,000 to about 500,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the high molecular weight component being partially neutralized with metal ions selected from the group consisting of lithium, sodium, zinc, calcium, potassium, magnesium, and a mixture of any these;

b. a low molecular weight component having a molecular weight of about from about 2,000 to about 30,000 and comprising one or more ethylene/α,β-ethylenically unsaturated $C_{3-8}$ carboxylic acid copolymers and/or one or more ethylene, alkyl (meth)acrylate, (meth)acrylic acid terpolymers; the low molecular weight component being partially neutralized with metal ions selected from the group consisting of lithium, sodium, zinc, calcium, potassium, magnesium, and a mixture of any of these; and c. from about 5 to about 46 weight percent (based on the total weight of said modified ionomeric polymer) of one or more fatty acids or metal salts of the fatty acid, the metal selected from the group consisting of calcium, sodium, zinc, potassium and lithium, barium and magnesium and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The generic formula for all fatty and waxy acids above acetic acid is $CH_3(CH_2)_X COOH$, wherein the carbon atom count includes the carboxyl group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to, stearic acid ($C_{18}$, i.e., $CH_3 (CH_2)_{16} COOH$), palmitic acid ($C_{16}$, i.e., $CH_3 (CH_2)_{14} COOH$), pelargonic acid ($C_9$, i.e., $CH_3 (CH_2)_7 COOH$) and lauric acid ($C_{12}$, i.e., $CH_3 (CH_2)_{10} OCOOH$). Examples of suitable unsaturated fatty acids, i.e., a fatty acid in which there are one or more double bonds between the carbon atoms in the alkyl chain, include but are not limited to oleic acid ($C_{18}$, i.e., $CH_3(CH_2)_7CH:CH(CH_2)_7COOH$).

The source of the metal ions used to produce the metal salts of the fatty or waxy acid salts used in the various modified ionomers are generally various metal salts, which provide the metal ions capable of neutralizing, to various extents, the carboxylic acid groups of the fatty acids. These include the sulfate, carbonate, acetate and hydroxylate salts of zinc, sodium, lithium, potassium, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of the fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E.I. DuPont de Nemours and Co. Inc.

9. Silicone Materials

Silicone materials also are well suited for blending into compositions within the scope of the present invention. These can be monomers, oligomers, prepolymers, or polymers, with or without additional reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl and decenyl. The alkenyl functionality can be located at any location of the silicon structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl and hexyl; cycloalkyl groups, such as cyclohexyl and cycloheptyl; aryl groups, such as phenyl, tolyl and xylyl; aralkyl groups, such as benzyl and phenethyl; and halogenated alkyl groups, such as 3,3,3-trifluoropropyl and chloromethyl. Another type of silicone material suitable for use in the present invention is one having hydrocarbon groups that lack aliphatic unsaturation. Specific examples of suitable silicones for use in making compositions of the present invention include the following: trimethylsiloxy end blocked dimethylsiloxane-methylhexenylsiloxane copolymers; dimethylhexenlylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsil-oxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above, in which at least one end group is dimethylhydroxysiloxy. Commercially available silicones suitable for use in compositions within the scope of the present invention include Silastic by Dow Corning Corp. of Midland, Mich., Blensil by GE Silicones of Waterford, N.Y., and Elastosil by Wacker Silicones of Adrian, Mich.

10. Miscellaneous Copolymers

Other types of copolymers also can be added to compositions within the scope of the present invention. Examples of copolymers comprising epoxy monomers and which are suitable for use within the scope of the present invention include styrene-butadiene-styrene block copolymers, in which the polybutadiene block contains an epoxy group, and styrene-isoprene-styrene block copolymers, in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd. of Osaka, Japan.

V. Filler

The polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fibers include metal oxides, such as zinc oxide and magnesium oxide. In another preferred embodiment the filler comprises a continuous or non-continuous fiber. In another preferred embodiment the filler comprises one or more so called nanofillers, as described in U.S. Pat. No. 6,794,447 and copending U.S. patent application Ser. No. 10/670,090 filed on Sep. 24, 2003 and copending U.S. patent application Ser. No. 10/926,509 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

As mentioned above, the nanofiller particles have an aggregate structure with the aggregates particle sizes in the micron range and above. However, these aggregates have a stacked plate structure with the individual platelets being roughly from about 1 nanometer (nm) thick and from about 100 to about 1000 nm across. As a result, nanofillers have extremely high surface area, resulting in high reinforcement efficiency to the material at low loading levels of the particles. The sub-micron-sized particles enhance the stiffness of the material, without increasing its weight or opacity and without reducing the material's low-temperature toughness.

Nanofillers when added into a matrix polymer, such as the polyalkenamer rubber, can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofillers controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. Nos. 5,962,553 to Ellsworth, 5,385,776 to Maxfield et al., and 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

For the polyalkenamers, the nanofiller material is added in an amount of from about 0.1% to about 20%, preferably from about 0.1% to about 15%, and most preferably from about 0.1% to about 10% by weight of nanofiller reacted into and substantially dispersed through intercalation or exfoliation into the structure of the polyalkenamer.

If desired, the various polymer compositions used to prepare the golf balls of the present invention can additionally contain other conventional additives such as plasticizers, pigments, antioxidants, U.V. absorbers, optical brighteners, or any other additives generally employed in plastics formulation or the preparation of golf balls.

Another particularly well-suited additive for use in the compositions of the present invention includes compounds having the general formula:

$$(R_2N)_m\text{---}R'\text{---}(X(O)_nOR_y)_m,$$

where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S or P with the proviso that when X=C, n=1 and y=1 and when X=S, n=2 and y=1, and when X=P, n=2 and y=2. Also, m=1-3. These materials are more fully described in copending U.S. patent application Ser. No. 11/182,170, filed on Jul. 14, 2005, the entire contents of which are incorporated herein by reference. These materials include, without limitation, caprolactam, oenantholactam, decanolactam, undecanolactam, dodecanolactam, capric-6-amino-acid, 11-aminoundecanoicacid, 12-aminododecanoic acid, diamine hexamethylene salts of adipic acid, azeleic acid, sebacic acid and 1,12-dodecanoic acid and the diamine nonamethylene salt of adipic acid, 2-aminocinnamic acid, L-aspartic acid, 5-aminosalicylic acid, aminobutyric acid; aminocaproic acid; aminocapyryic acid; 1-(aminocarbonyl)-1-cyclopropanecarboxylic acid; aminocephalosporanic acid; aminobenzoic acid; aminochlorobenzoic acid; 2-(3-amino-4-chlorobenzoyl)benzoic acid; aminonaphtoic acid; aminonicotinic acid; aminonorbornanecarboxylic acid; aminoorotic acid; aminopenicillanic acid; aminopentenoic acid; (aminophenyl)butyric acid; aminophenyl propionic acid; aminophthalic acid; aminofolic acid; aminopyrazine carboxylic acid; aminopyrazole carboxylic acid; aminosalicylic acid; aminoterephthalic acid; aminovaleric acid; ammonium hydrogencitrate; anthranillic acid; aminobenzophenone carboxylic acid; aminosuccinamic acid, epsilon-caprolactam; omega-caprolactam, (carbamoylphenoxy)acetic acid, sodium salt; carbobenzyloxy aspartic acid; carbobenzyl glutamine; carbobenzyloxyglycine; 2-aminoethyl hydrogensulfate; aminonaphthalenesulfonic acid; aminotoluene sulfonic acid; 4,4'-methylene-bis-(cyclohexylamine)carbamate and ammonium carbamate.

Most preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; omega-caprolactam, and any and all combinations thereof.

In an especially preferred embodiment a nanofiller additive component in the golf ball of the present invention is surface modified with a compatibilizing agent comprising the earlier described compounds having the general formula:

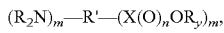

A most preferred embodiment would be a filler comprising a nanofiller clay material surface modified with an amino acid including 12-aminododecanoic acid. Such fillers are available from Nanonocor Co. under the tradename Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

VI. Miscellaneous Additives

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include colorants, UV stabilizers, photo stabilizers, antioxidants, colorants, dispersants, mold releasing agents, processing aids, fillers, and any and all combinations thereof.

VII. Method for Making Disclosed Compositions

The disclosed polymer and/or polymer precursor/peptizer compositions in the present invention can be formed by any suitable mixing methods. The polymer and peptizer composition, including cross-linking agent(s), and any other desired additives, such as an accelerator if appropriate, can be mixed together by any suitable methods now known or hereafter developed to form golf balls, with or without melting. Dry blending equipment, such as a tumble mixer, V-blender, or ribbon blender, can be used to mix the compositions. The unsaturated polymer, peptizer, and accelerator can be mixed together with a cross-linking agent, or each additive can be added in an appropriate sequence to the unsaturated polymer, e.g., peptizer then accelerator then cross-linking agent. The golf ball compositions can be mixed using a mill, internal mixer, extruder or combinations of these, with or without application of thermal energy to produce melting. The composition can be prepared by any suitable process, such as single screw extrusion, twin-screw extrusion, banbury mixing, two-roll mill mixing, dry blending, by using a master batch, or any combination of these techniques. The resulting compositions can be processed by any method useful to form golf balls or golf ball preforms, such as extrusion (or disclosed in detail in applicants' co-pending U.S. Application No. 60/699,303, incorporated herein by reference) profile-extrusion, pultrusion, compression molding, transfer molding, injection molding, cold-runner molding, hot-runner molding, reaction injection molding or any combination thereof. The polymer/polymer modifier composition can be a blend that is not subjected to any further crosslinking or curing; a blend that is subjected to crosslinking or curing; a blend that forms a semi- or full-interpenetrating polymer network (IPN) upon crosslinking or curing; or a thermoplastic vulcanizate blend. The composition can be crosslinked by any crosslinking method(s), such as, for example, using chemical crosslinking agents, applying thermal energy, irradiation, or a combination thereof. The crosslinking, reaction can be performed during any processing stage, such as extrusion, compression molding, transfer molding, injection molding, post-curing, or a combination thereof. In one embodiment, the ability of the disclosed polymer and/or polymer precursor/peptizer compositions to be injection molded and cured either subsequently by compression molding or actually during the injection molding process itself provides considerable flexibility in manufacture of the individual golf ball components.

For instance, the disclosed polymer and/or polymer precursor/peptizer compositions, including crosslinking agents, fillers and the like, can be mixed together with or without melting individual components. Dry blending equipment, such as a tumble mixer, V-blender, ribbon blender, or two-roll mill, can be used to mix the compositions. The golf ball compositions can also be mixed using a mill, internal mixer such as a Banbury or Farrel continuous mixer, extruder or combinations of these, with or without application of thermal energy to produce melting. The various components can be mixed together with the cross-linking agents, or each additive can be added in an appropriate sequence. In another method of manufacture the cross-linking agents and other components can be added as part of a concentrate.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed.

Where crosslinking agents are used, the compression and heat may liberate free radicals, such as by decomposing one or more peroxides, which initiate cross-linking. The temperature and duration of the molding cycle are selected based upon the type of crosslinking agent selected. The molding cycle may have a single molding step that is performed at a particularly suitable temperature for fixed time duration; the molding cycle may have plural molding steps at plural different suitable temperatures for fixed durations; the molding cycle may include one or more steps where the temperature is increased or decreased from an initial temperature during the molding step period; etc.

For example, one process for preparing golf ball cores comprising the disclosed compositions comprises first mixing various core ingredients on a two roll mill to form slugs of approximately 30-45 grams. The slugs are then compression molded in a single step at an effective temperature, typically between from about 150° C. to about 210° C., for an effective time period, which typically is between from about 2 to about 12 minutes.

Alternatively, the core may be formed by first injection molding the core composition into a mold followed by a subsequent compression molding step to complete the curing step. The curing time and conditions in this step depend on the formulation of the composition used.

Alternatively, the core may be formed from a suitable composition in a single injection molding step in which the composition is injection molded into a heated mold at a sufficient temperature to yield the desired core properties. If the material is partially cured, additional compression molding and/or irradiation steps optionally may be used to complete the curing process and thereby yield the desired core properties.

Similarly in both intermediate layer(s) and outer cover formation, the use of disclosed polymer/peptizer compositions allows for considerable flexibility in the layer formation steps of golf ball construction. For instance, finished golf balls may be prepared by initially positioning a solid preformed core in an injection molding cavity followed by uniform injection of the intermediate or cover layer composition sequentially over the core to produce layers of the required thickness and ultimately golf balls of the required diameter. Again use of a heated injection mold allows the temperature to be controlled sufficiently to either partially or fully crosslink the material to yield the desired layer properties. If the material is partially cured, additional compression molding or irradiation steps optionally may be employed to complete the curing process to yield the desired layer properties.

Alternatively, the intermediate and/or cover layers also may be formed around the core or intermediate layer by first forming half shells by injection molding the polymer/polymer modifier compositions followed by a compression molding the half shells about the core or intermediate layer to cure the layers in the final ball.

Alternatively, the intermediate and/or cover layers also may be formed around the core or intermediate layer by first forming half shells by injection molding the compositions again using a heated injection mold that allows sufficient temperature control to yield the desired half shell properties. The resulting half shells then may be compression molded around the core or core plus intermediate layer. Again, if the half shell is partially cured, the additional compression molding or irradiation steps optionally may be tailored to complete the curing process to yield the desired layer properties.

Finally, outer or intermediate covers comprising suitable compositions also may be formed around the cores using conventional injection molding, casting, reaction injection molding, transfer molding, compression molding techniques, or combination of these techniques.

In addition, if radiation is used as a cross-linking agent, then other additives can be irradiated following mixing, during forming into a part such as the core, intermediate layer, or outer cover of a ball, or after forming such part.

A preferred method for making golf balls within the scope of the present invention involves injection molding a core, intermediate layer, or cover of the composition into a cold mold without inducing heavy cross-linking of the unsaturated polymer. The product from this process then is compression-molded to induce partial or full cross-linking of the unsaturated polymer by use of thermal energy.

In another preferred method, injection molding is used to inject the composition around a core positioned in a mold, in which thermal energy is applied to induce cross-linking. In yet another preferred method, an intermediate layer or a cover of the unsaturated polymer, peptizer, and cross-linking agent can be prepared by injection molding the mixture as half shells. The half shells are then positioned around a core and compression molded. The heat and pressure first melt the composition to seal the two half shells together forming a complete layer. Additional thermal energy induces cross-linking of the unsaturated polymer.

In another preferred method, half shells of the unsaturated polymer and peptizer are prepared. The half shells are coated with the cross-linking agent and compression molded around a core to form a layer and to induce cross-linking. In another preferred method, a layer incorporating the unsaturated polymer and peptizer is positioned around a core to form a layer. The layer then is coated with the cross-linking agent and compression molded to induce cross-linking. When used to form a cover layer, a preferred embodiment of the method involves preparing the cover layer using injection molding and forming dimples on the surface of the cover layer, while inducing full or partial cross-linking of the layer during injection molding. Alternately, the cover layer can be formed using injection molding without dimples, after which the cover layer is compression molded to form dimples and also induce full or partial cross-linking.

IX. EXAMPLES

The following examples are provided to illustrate certain features of working embodiments of the disclosed invention. A person of ordinary skill in the art will appreciate that the invention is not limited to those features exemplified by these working embodiments.

PGA compression, C.O.R., and Shore D hardness were conducted on materials and/or golf balls made according to the present disclosure using the test methods as defined below.

Shore D hardness was measured in accordance with ASTM Test D2240.

Compression is measured by applying a spring-loaded force to the sphere to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

$$(\text{Atti or PGA compression}) = (160 - \text{Riehle Compression}).$$

Thus, a Riehle compression of 100 would be the same as an Atti compression of 60.

Initial velocity of a golf ball after impact with a golf club is governed by the United States Golf Association ("USGA"). The USGA requires that a regulation golf ball can have an initial velocity of no more than 250 feet per second ±2% or 255 feet per second. The USGA initial velocity limit is related to the ultimate distance that a ball may travel (280 yards ±6%), and is also related to the coefficient of restitution ("COR"). The coefficient of restitution is the ratio of the relative velocity between two objects after direct impact to the relative velocity before impact. As a result, the COR can vary from 0 to 1, with 1 being equivalent to a completely elastic collision and 0 being equivalent to a completely inelastic collision. Since a ball's COR directly influences the ball's initial velocity after club collision and travel distance, golf ball manufacturers are interested in this characteristic for designing and testing golf balls.

One conventional technique for measuring COR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds through the light screens which again measure the time period required to transit between the light screens. This provides an outgoing transit time period proportional to the ball's outgoing velocity. The coefficient of restitution can be calculated by the ratio of the outgoing transit time period to the incoming transit time period, $COR = T_{Out}/T_{in}$.

Example 1

This example describes compositions that were made using 2,3,5,6-tetrachloro-4-pyridinethiol (TCPT), in comparison to compositions made without using a peptizer, compositions that were made using known peptizers, such as pentachlorothiophenol, pentachlorothiophenol, the zinc salt of pentachlorothiophenol (Zn-PCTP), the ammonium salt of pentachlorothiophenol (NH$_4$-PCTP). A series of ball cores having diameters of 1.48 inches and suitable for use in golf balls within the scope of the present invention were prepared. Each of the cores incorporated predominantly cis-1,4-polybutadiene rubber. Additionally, the cores incorporated selected amounts of additional agents, such as zinc oxide (ZnO), zinc diacrylate (ZDA), and peroxide. Finally, some cores incorporated selected amounts of pentachlorothiophenol, the zinc salt of pentachlorothiophenol (Zn-PCTP), the ammonium salt (NH$_4$-PCTP) generated by reaction between PCTP and ammonium hydroxide, and 2,3,5,6-tetrachloro-4-pyridinethiol. The cores were compression molded at 180° C. for 12 minutes. Composition and property information for cores made according to this example are provided in Tables 1-3. The samples were then tested for C.O.R. and compression after one day and after 5 days.

TABLE 1

|  | No Additive | PCTP | Zn-PCTP | NH$_4$-PCTP | TCPT |
|---|---|---|---|---|---|
| CC | 50 | 38 | 38 | 34 | 39 |
| COR | 0.787 | 0.794 | 0.797 | 0.792 | 0.791 |
| Hardness (Shore D) | 41.3 | 40 | 38 | 39.8 | 40.8 |
| Specific Gravity | 1.211 | 1.206 | 1.205 | 1.198 | 1.19 |
| AFTER 5 DAYS | | | | | |
| Core Compression | 52 | 39 | 42 | 36 | 41 |
| COR | 0.787 | 0.796 | 0.799 | 0.793 | 0.793 |
| Hardness (Shore D) | 40.8 | 38.6 | 40.7 | 38.9 | 38.8 |
| Specific Gravity | 1.197 | 1.19 | 1.198 | 1.194 | 1.195 |

TABLE 2

|  | No Additive | PCTP | TCPT |
|---|---|---|---|
| Core Compression (PGA) | 76 | 60 | 66 |
| COR | 0.809 | 0.813 | 0.813 |
| Hardness (Shore D) | 44.5 | 45.5 | 43.6 |
| Specific Gravity | 1.188 | 1.178 | 1.18 |

TABLE 3

|  | No Additive | PCTP | TCPT |
|---|---|---|---|
| Core Compression (PGA) | 64 | 51 | 57 |
| COR | 0.803 | 0.808 | 0.806 |
| Hardness (Shore D) | 42.3 | 41.4 | 41.8 |
| Specific Gravity | 1.175 | 1.179 | 1.177 |

The best results are obtained by maximizing the C.O.R. value while maintaining or decreasing Atti compression. The results of the testing indicate that the addition of TCPT increased the COR value relative to no additive used, and substantially maintained the COR relative to PCTP-containing compositions. With respect to core compression (CC), the addition of a peptizing agent generally decreases CC. But, balls made having TCPT had substantially similar or greater core compression relative to balls made using PCTP or salts thereof. Being able to use a different peptizer and provide substantially similar or improved results compared to known balls allows for greater flexibility in making golf balls by expanding composition parameters that allow for adjusting compression and/or C.O.R.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A golf ball, comprising a core and at least one layer surrounding the core, the layer surrounding the core comprising a polymer composition comprising a polyalkenamer, a cross-linking agent, and an effective amount of at least one peptizer having a formula

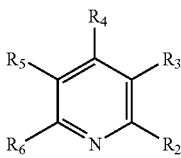

where at least one of $R_2$-$R_6$ is —SH, at least one of $R_2$-$R_6$ is halogen, with any remaining $R_2$-$R_6$ being independently selected from hydrogen, halogen, oxygen-bearing moieties, sulfur-bearing moieties, or aliphatic groups.

2. The golf ball according to claim 1 where the core comprises an unsaturated polymer, a synthetic rubber, a natural rubber, a polyalkenamer, an olefinic thermoplastic elastomer, or combinations thereof.

3. The golf ball according to claim 2 where the unsaturated polymer is 1,2-polybutadiene, cis-1,4-polybutadiene, trans-1,4-polybutadiene, cis-polyisoprene, trans-polyisoprene, polychloroprene, polybutylene, styrene-butadiene rubber, styrene-butadiene-styrene block copolymer, styrene-isoprene-styrene block copolymer, nitrile rubber, silicone rubber, polyurethane, polyoctenamer, or mixtures thereof.

4. The golf ball according to claim 1 where the core or layer surrounding the core comprises at least a second polymer selected from synthetic and natural rubbers, thermoset polyurethanes and thermoset polyureas, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, polyurethane ionomer, thermoplastic polyurethanes, thermoplastic polyureas, polyamides, copolyamides, polyesters, copolyesters, polycarbonates, polyolefins, halogenated polyolefins, halogenated polyethylenes, polyphenylene oxide, polyphenylene sulfide, diallyl phthalate polymer, polyimides, polyvinyl chloride, polyamide-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, polysiloxane, a compound having a general formula $(R_2N)_m—R'—(X(O)_nOR_y)_m$, wherein R is selected from the group consisting of hydrogen, one or more $C_1$-$C_{17}$ aliphatic systems, one or more cycloaliphatic systems, one or more aromatic systems, R' is a bridging group comprising one or more unsubstituted $C_1$-$C_{17}$ straight chain or branched aliphatic or alicyclic groups, one or more substituted straight chain or branched aliphatic or alicyclic groups, one or more aromatic groups, one or more oligomers each containing up to 12 repeating units, and when X is C or S or P, m is 1-3, when X=C, n=1 and y=1, when X=S, n=2 and y=1, and any and all combinations of such materials.

5. The golf ball according to claim 1 where the peptizer has a formula

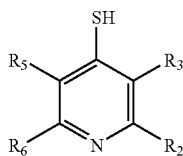

where at least one of $R_2$-$R_3$ and $R_5$-$R_6$ is halogen, with any remaining $R_2$-$R_3$ and $R_5$-$R_6$ being independently hydrogen or halogen.

6. The golf ball according to claim 1 where the cross-linking agent is a primary, secondary, or tertiary aliphatic, alicyclic or aromatic peroxide.

7. The golf ball according to claim 1 where the core comprises polybutadiene and the peptizer.

8. The golf ball according to claim 1 where the core or the at least one layer comprises a fiber, a filler, or both.

9. The golf ball according to claim 8 where the filler is selected from precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, calcium carbonate, magnesium carbonate, barium carbonate, calcium sulfate, magnesium sulfate, barium sulfate, tungsten, steel, copper, cobalt, iron, metal alloys, tungsten carbide, zinc oxide, calcium oxide, barium oxide, titanium dioxide, metal stearates, particulate carbonaceous materials, nanofillers and any and all combinations thereof.

10. The golf ball according to claim 1 where the polymer composition comprises a cross-linking agent selected from sulfur compounds, peroxides, azides, maleimides, a co-cross-linking agent comprising zinc or magnesium salts of an unsaturated fatty acid having from about 3 to about 8 carbon atoms, a base resin, a peptizer, an accelerator, a UV stabilizer, a photostabilizer, a photoinitiator, a co-initiator, an antioxidant, a colorant, a dispersant, a mold release agent, a processing aid, a fiber, a density adjusting filler, a nanofiller, an inorganic filler, an organic filler, or combinations thereof.

11. The golf ball according to claim 1 having a core, one or more intermediate layers, and a cover, the core having a PGA compression of from about 30 to about 190, the one or more intermediate layers or cover layer having a thickness of from about 0.01 to about 0.17 inch and a Shore D hardness of greater than about 25.

12. The golf ball according to claim 1 comprising the core, the at least one layer comprising the polymer composition, at least one intermediate layer and a cover.

13. The golf ball according to claim 1 comprising a four-piece golf ball, comprising:
 a rubber-based core having a center;
 the at least one layer comprising the polymer composition;
 an inner intermediate layer or an outer intermediate layer; and
 a cover.

14. The golf ball of claim 1, wherein the peptizer is 2,3,5,6-tetrachloro-4-pyridinethiol.

15. The golf ball of claim 14, wherein the polymer composition further comprises a zinc or magnesium salt of an unsaturated fatty acid having from about 3 to about 8 carbon atoms.

16. The golf ball of claim 14, wherein the polymer composition further comprises zinc diacrylate.

17. The golf ball of claim 1, wherein the polymer composition further comprises a zinc or magnesium salt of an unsaturated fatty acid having from about 3 to about 8 carbon atoms.

18. A method for making a golf ball, comprising:
 providing a polymer composition comprising a polyalkenamer and an effective amount of at least one peptizer having a formula

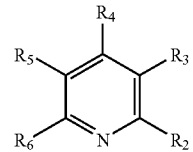

where at least one of $R_2$-$R_6$ is —SH, at least one of $R_2$-$R_6$ is halogen, with any remaining $R_2$-$R_6$ being independently selected from hydrogen, halogen, oxygen-bearing moieties, sulfur-bearing moieties, or aliphatic group; and
 forming at least one layer of a golf ball around the core, wherein the at least one layer comprises the polymer composition.

19. The method of claim 18 where the golf ball has a core comprising polybutadiene and the peptizer.

* * * * *